United States Patent
Silversides et al.

(10) Patent No.: US 9,916,539 B2
(45) Date of Patent: Mar. 13, 2018

(54) SYSTEMS AND METHODS FOR PROCESSING GEOPHYSICAL DATA

(71) Applicant: THE UNIVERSITY OF SYDNEY, New South Wales (AU)

(72) Inventors: Katherine Lee Silversides, Glenmore Park (AU); Arman Melkumyan, Lane Cove North (AU); Derek Wyman, Glebe (AU); Peter James Hatherly, Lavender Bay (AU)

(73) Assignee: The University of Sydney, New South Wales (AU)

( * ) Notice: Subject to any disclaimer, the term of this patent is extended or adjusted under 35 U.S.C. 154(b) by 369 days.

(21) Appl. No.: 14/408,957

(22) PCT Filed: Jun. 18, 2013

(86) PCT No.: PCT/AU2013/000650
§ 371 (c)(1),
(2) Date: Dec. 18, 2014

(87) PCT Pub. No.: WO2013/188911
PCT Pub. Date: Dec. 27, 2013

(65) Prior Publication Data
US 2015/0193691 A1    Jul. 9, 2015

(30) Foreign Application Priority Data

Jun. 18, 2012 (AU) ................. 2012902550

(51) Int. Cl.
*G06N 7/00* (2006.01)
*G01V 5/06* (2006.01)
*G06N 99/00* (2010.01)

(52) U.S. Cl.
CPC .............. *G06N 7/005* (2013.01); *G01V 5/06* (2013.01); *G06N 99/005* (2013.01)

(58) Field of Classification Search
None
See application file for complete search history.

(56) References Cited

U.S. PATENT DOCUMENTS

| 3,775,984 A | 12/1973 | Livingston |
| 3,917,005 A | 11/1975 | Cannon et al. |

(Continued)

FOREIGN PATENT DOCUMENTS

| AU | 2013277928 | 6/2017 |
| CA | 2 599 471 | 2/2009 |

(Continued)

OTHER PUBLICATIONS

Silversides, KL, Melkumyan, A, Wyman, DA, Hatherly, PJ, Nettleton, E (2011) Detection of Geological Structure using Gamma Logs for Autonomous Mining. In IEEE International Conference on Robotics and Automation, May 9-13, 2011. Shanghai, China, pp. 1577-1582.

(Continued)

*Primary Examiner* — Alan Chen
(74) *Attorney, Agent, or Firm* — Ladas & Parry, LLP

(57) ABSTRACT

Described herein is a computer implemented method for generating a probabilistic model usable to identify instances of a target feature in geophysical data sets stored on a memory device. The computer implemented method using a computer processing unit to generate a probabilistic model from a training library for use in identifying instances of the target feature in the geophysical data sets, applying, using the computer processing unit, the probabilistic model to one or more of the geophysical data sets to generate a plurality of results, processing, using the computer processing unit, the set of results according to an acceptability criteria in order to identify a plurality of candidate results, receiving a selection of one or more of the candidate results and for the or each selected candidate result displaying on a display the (Continued)

result and its associated geophysical data set to assist a user in making an assessment as to whether or not the probabilistic model is an acceptable model for the processing of the geophysical data sets, receiving from a user an assessment as to whether or not the probabilistic model is an acceptable model; and if the assessment received indicates the probabilistic model is an acceptable model for processing the geophysical data, outputting the probabilistic model and/or the training library.

17 Claims, 9 Drawing Sheets

(56) References Cited

U.S. PATENT DOCUMENTS

| | | | |
|---|---|---|---|
| 3,977,005 | A | 8/1976 | Cannon |
| 4,104,512 | A | 8/1978 | Strayer |
| 4,987,540 | A | 1/1991 | Luke, Jr. |
| 5,111,401 | A | 5/1992 | Everett et al. |
| 5,367,456 | A | 11/1994 | Summerville |
| 5,633,946 | A | 5/1997 | Lachinski et al. |
| 5,646,845 | A | 7/1997 | Gudat et al. |
| 5,823,481 | A | 10/1998 | Gottsehlich |
| 5,825,981 | A | 10/1998 | Matsuda |
| 5,850,622 | A | 12/1998 | Vassiliou et al. |
| 5,902,351 | A | 5/1999 | Streit et al. |
| 5,944,764 | A | 8/1999 | Henderson |
| 5,987,379 | A | 11/1999 | Smith |
| 6,549,879 | B1 | 4/2003 | Cullick et al. |
| 6,608,913 | B1 | 8/2003 | Hinton et al. |
| 6,622,090 | B2 | 9/2003 | Lin |
| 6,633,800 | B1 | 10/2003 | Ward et al. |
| 6,681,175 | B2 | 1/2004 | MacPhail et al. |
| 6,792,353 | B2 | 9/2004 | Lin |
| 6,799,100 | B2 | 9/2004 | Burns et al. |
| 6,885,863 | B2 | 4/2005 | Parkman et al. |
| 6,937,935 | B2 | 8/2005 | Sato |
| 6,975,923 | B2 | 12/2005 | Spriggs |
| 7,136,748 | B2 | 11/2006 | Umezu et al. |
| 7,526,492 | B2 | 4/2009 | Mikuriya et al. |
| 7,885,732 | B2 | 2/2011 | Troy et al. |
| 7,933,395 | B1 | 4/2011 | Bailly et al. |
| 7,933,929 | B1 | 4/2011 | McClendon |
| 7,970,532 | B2 | 6/2011 | Tehan et al. |
| 8,068,950 | B2 | 11/2011 | Duggan |
| 8,103,398 | B2 | 1/2012 | Duggan |
| 8,103,438 | B2 | 1/2012 | Petrie et al. |
| 8,200,423 | B2 | 6/2012 | Dietsch et al. |
| 8,256,004 | B1 | 8/2012 | Hill et al. |
| 8,290,942 | B2 | 10/2012 | Jones et al. |
| 8,306,726 | B2 | 11/2012 | Donnelli |
| 8,315,838 | B2 | 11/2012 | Durrant-Whyte |
| 8,326,532 | B2 | 12/2012 | Kmiecik |
| 8,350,849 | B1 | 1/2013 | Jones et al. |
| 8,521,352 | B1 | 8/2013 | Ferguson |
| 8,527,199 | B1 | 9/2013 | Burnette |
| 8,583,313 | B2 | 11/2013 | Mian |
| 9,382,797 | B2 | 7/2016 | Nettleton |
| 2002/0052690 | A1 | 5/2002 | Nivlet |
| 2002/0143461 | A1 | 10/2002 | Burns et al. |
| 2003/0060968 | A1 | 3/2003 | MacPhail |
| 2003/0100991 | A1 | 5/2003 | MacPhail |
| 2004/0139049 | A1 | 7/2004 | Hancock et al. |
| 2004/0172189 | A1 | 9/2004 | Maeda |
| 2004/0196163 | A1 | 10/2004 | Takenaga |
| 2004/0252288 | A1 | 12/2004 | Kacyra et al. |
| 2005/0004723 | A1 | 1/2005 | Duggan |
| 2005/0040232 | A1 | 2/2005 | Maloney |
| 2005/0240348 | A1 | 10/2005 | Knight et al. |
| 2005/0283294 | A1 | 12/2005 | Lehman, Jr. |
| 2006/0044146 | A1 | 3/2006 | Ferguson |
| 2006/0074825 | A1 | 4/2006 | Mirowski |
| 2006/0075356 | A1 | 4/2006 | Faulkner |
| 2006/0221072 | A1 | 10/2006 | Se et al. |
| 2006/0249321 | A1 | 11/2006 | Cook et al. |
| 2007/0029449 | A1 | 2/2007 | Matos |
| 2007/0150149 | A1 | 6/2007 | Peterson |
| 2007/0168308 | A1 | 7/2007 | Wang et al. |
| 2007/0271002 | A1 | 11/2007 | Hoskinson |
| 2008/0045234 | A1 | 2/2008 | Reed |
| 2008/0208368 | A1 | 8/2008 | Grgic |
| 2008/0278311 | A1 | 11/2008 | Grange et al. |
| 2009/0062971 | A1 | 3/2009 | Rottig et al. |
| 2009/0082949 | A1 | 3/2009 | Petrie et al. |
| 2009/0099730 | A1 | 4/2009 | McClure |
| 2009/0327342 | A1 | 12/2009 | Xiao et al. |
| 2010/0076631 | A1 | 3/2010 | Mian |
| 2010/0256836 | A1 | 10/2010 | Mudalige |
| 2010/0280699 | A1 | 11/2010 | Bageshwar |
| 2011/0035346 | A1 | 2/2011 | Melkumyan |
| 2011/0163733 | A1 | 7/2011 | Nelson et al. |
| 2011/0166840 | A1 | 7/2011 | Green et al. |
| 2011/0179176 | A1 | 7/2011 | Ravichandran |
| 2011/0273961 | A1 | 11/2011 | Hu |
| 2011/0298923 | A1 | 12/2011 | Mukae |
| 2012/0044043 | A1 | 2/2012 | Nettleton |
| 2012/0046927 | A1 | 2/2012 | Nettleton |
| 2012/0046983 | A1 | 2/2012 | Nettleton |
| 2012/0053775 | A1 | 3/2012 | Nettleton |
| 2012/0123628 | A1 | 5/2012 | Duggan et al. |
| 2012/0259540 | A1 | 10/2012 | Kishore et al. |
| 2012/0316725 | A1 | 12/2012 | Trepagnier |
| 2013/0016104 | A1 | 1/2013 | Morrison |
| 2013/0289837 | A1 | 10/2013 | Beams et al. |

FOREIGN PATENT DOCUMENTS

| | | |
|---|---|---|
| JP | 8248146 | 9/1996 |
| WO | 2004/088092 | 10/2004 |
| WO | 2008/113098 | 9/2008 |
| WO | 2009/009822 | 1/2009 |
| WO | 2009/027815 | 3/2009 |
| WO | 2009/027816 | 3/2009 |
| WO | 2009/109007 | 9/2009 |
| WO | 2010/124336 | 11/2010 |
| WO | 2010/124337 | 11/2010 |
| WO | 2010/124339 | 11/2010 |
| WO | WO2010/124335 | 11/2010 |

OTHER PUBLICATIONS

Hagemannm S, Rosiere C, Gutzmer J, Beukes NJ (ed) Banded Iron Formation-Related High Grade Iron Ore, Rev Econ Geol15: 197-221.

Laselles DF (2000) Marra Mamba iron formation stratigraphy in the eastern Chichester Range, Western Australia. Aust J Earth Sci 47: 799-806.

Jones H, Walraven F, Knott GG (1973) Natural gamma logging as an aid to iron ore exploration in the Pilbara region of Western Australia. Australasian Institute of Mining and Metallurgy Annual Conference (Perth, Australia): 53-60.

Borsaru M, Zhoua B, Aizawa T, Karashinna H, Hashimoto T (2006) Automated lithology prediction from PGNAA and other geophysical data logs. Appl Radiat Isotopes 64: 272-282.

Baldwin JL, Bateman RM, Wheatley, CL (1990) Application of a neural network to the problem of mineral identification from well logs. Log Anal: 279-293.

Klose CD (2006) Self-organizing maps for geoscientific data analysis: geological interpretation of multidimensional geophysical data. Com put Geosci 10: 265-277.

Chang H, Chen H, Fang J, (1997) Lithology determination from well logs with fuzzy associative memory neural network. IEEE Trans. Geosci. Remote Sensing 35: 773-780.

Kadkhodaie Ilkhchi A, Rezaee M, Moallemi SA (2006) A fuzzy logic approach for estimation of permeability and rock type from conventional well log data: an example from the Kangan reservoir in the Iran Offshore Gas Field. J Geophys Eng 3: 356-369.

(56) References Cited

OTHER PUBLICATIONS

Rasmussen CE, Williams CKI (2006) Gaussian Processes for Machine Learning. Springer Science+Business Media, LLC Bishop CM (2006) Pattern Recognition and Machine Learning. Springer: Berlin.

Melkumyan A, Nettleton E, An Observation Angle Dependent Nonstationary Covariance Function for Gaussian Process Regression, International Conference on Neural Information Processing (ICONIP), Lecture Notes in Computer Science 5863, 2009, pp. 331-339), Matern, Exponential, Rational Quadratic.

Cohn DA, Ghahramani Z, Jordan MI (1996) Active Learning with Statistical Models. J Artif Intell Res 4: 129-145.

ISR/WO for corresponding PCT/AU2013/000650 dated Jul. 9, 2013.

IPRP for corresponding PCT/AU2013/000650 dated Jun. 16, 2014.

Office action from Australian Patent Application No. 2013277928 dated Apr. 4, 2017.

PCT International Search Report and Written Opinion from PCT/AU2010/000494 dated Jul. 15, 2010.

Office action from Australian Patent Application No. 2010242540 dated May 28, 2014.

Office action from Canadian Patent Application No. 2760637 dated Feb. 29, 2016.

Office action from Chilean Patent Application No. 2710-2011 dated Sep. 13, 2013 and English summary/translation.

Office action from Chilean Patent Application No. 2710-2011 dated May 14, 2014 and English summary/translation.

Office action from Chilean Patent Application No. 2710-2011 dated Feb. 10, 2017 and English summary/translation.

Office action from Chinese Patent Application No. 201080026275.2 dated Sep. 4, 2013 and Search Report with its English summary/translation.

Office action from Chinese Patent Application No. 201080026275.2 dated May 23, 2014 with its English summary/translation.

Office action from Chinese Patent Application No. 201080026275.2 dated Nov. 4, 2014 with its English summary/translation.

Office action from Chinese Patent Application No. 201080026275.2 dated May 21, 2015 with its English summary/translation.

Office action from Eurasian Patent Application No. 201171337 dated Sep. 30, 2013, and its English summary/translation.

Office action from Eurasian Patent Application No. 201171337 dated Jun. 5, 2014, and its English summary/translation.

Office action from Peruvian Patent Application No. 001884-2011 dated Dec. 2014, and English summary/translation.

Office action from U.S. Appl. No. 13/318,464 (now U.S. Pat. No. 9,382,797) dated Jan. 29, 2014.

Office action from U.S. Appl. No. 13/318,464 (now U.S. Pat. No. 9,382,797) dated Jul. 1, 2014.

Office action from U.S. Appl. No. 13/318,464 (now U.S. Pat. No. 9,382,797) dated Jan. 27, 2015.

Office action from U.S. Appl. No. 13/318,464 (now U.S. Pat. No. 9,382,797) dated May 14, 2015.

Office action from U.S. Appl. No. 13/318,464 (now U.S. Pat. No. 9,382,797) dated Sep. 29, 2015.

Bayne, Jay S., "Automation and Control in Large-Scale Interactive Systems", Proceedings of the Fifth IEEE International Symposium on Object-Oriented Real-Time Distributed Computing (ISORC'02), 8 pp., (2002).

Bayne, Jay S., "Creating Rational Organizations—Theory of Enterprise Command and Control", a Meta Command Systems Books, Cafe Press, 258 pp., (2006).

Burger, D.J. "Integration of the Mining Plan in a Mining Automation System using State-of-the-Art Technology at De Beers Finsch Mine," The Journal of the South African Institute of Mining and Metallurgy, vol. 106; 8pgs. (Aug. 2006).

Craig C. Freudenrich, "How Air Traffic Control Works", How Stuff Works, retrieved from the Internet on Feb. 16, 2012: http://web.archive.org/web/20061106004223/http://www.howstuffworks.com/ai-r-traffic-control.htm/printable, 10 pp., (Nov. 6, 2006), reprinted on Jul. 26, 2017.

International Civil Aviation Organization, "Advanced Surface Movement Guidance and Control Systems (A-SMGCS) Manual", First Edition, 89 pp., (2004).

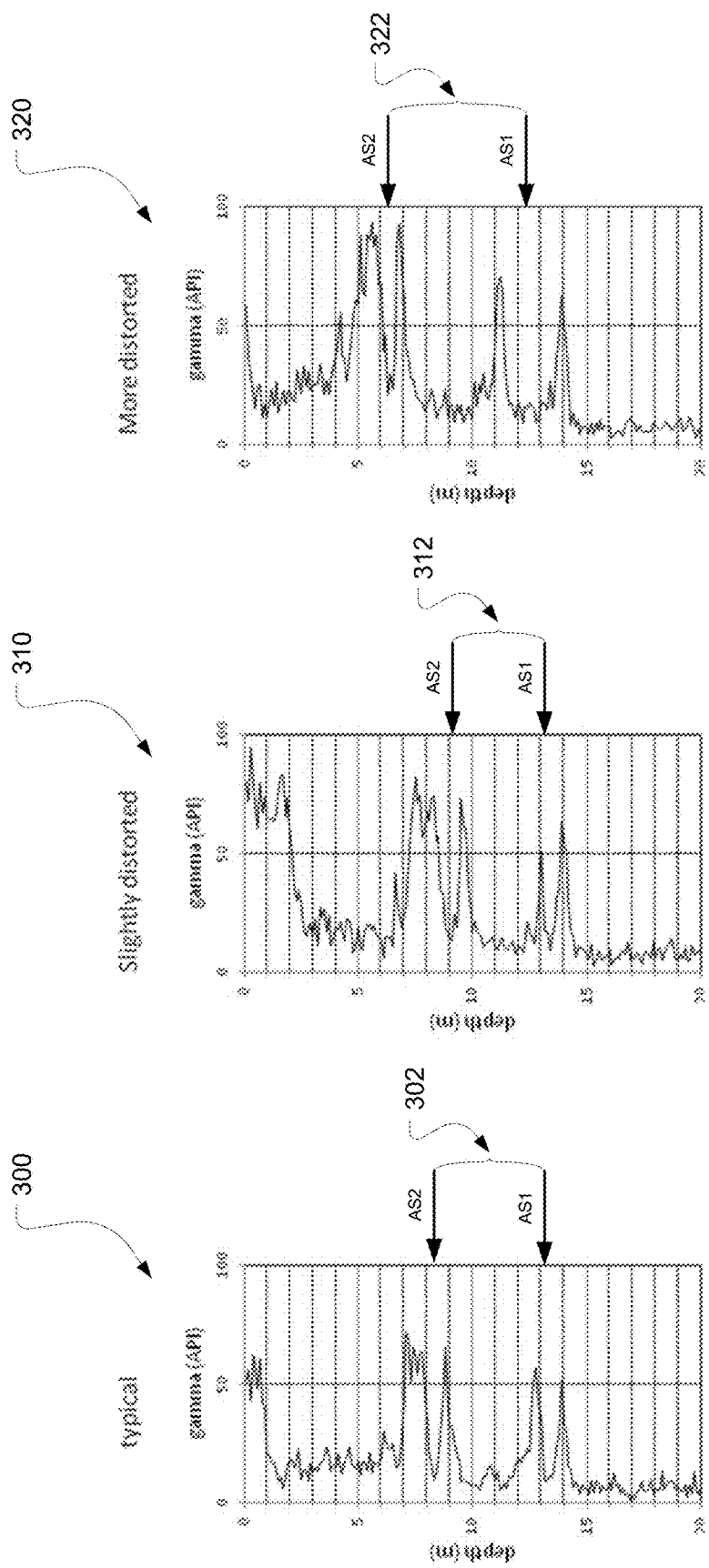

SYSTEMS AND METHODS FOR PROCESSING GEOPHYSICAL DATA

CROSS-REFERENCE TO RELATED APPLICATIONS

This application is the U.S. National Stage of International Patent Application No. PCT/AU2013/000650, filed on Jun. 18, 2013, which claims priority to Australian Patent Application No. 2012902550, filed on Jun. 18, 2012, the disclosures of which are hereby incorporated by reference in their entireties.

FIELD OF THE INVENTION

The present invention relates to systems and methods for processing geophysical data to identify target features. The invention is particularly suitable for use in processing natural gamma logs to identify marker shale bands in a mine, and will be described in relation to that specific but non-limiting embodiment.

BACKGROUND OF THE INVENTION

Typical pit mines include both valuable ore (e.g. iron ore) as well as a large amount of waste material. In order to plan and execute mining operations for the extraction of the valuable ore, an accurate representation of the in-ground geology is advantageous.

In current practice it is known to acquire geophysical data such as natural gamma logs from the mine environment (e.g. from exploration drill holes). The natural gamma logs are then manually analysed (i.e. visually inspected) by a trained geologist in order to identify characteristic signatures of distinctive features (i.e. target features) in the underground geology. In the case of stratiform mine environments, such target features include marker bands of specific material (such as shale), the marker bands being distinct geological layers that help establish the geological sequence of the mine and any local warping (folding) and fracturing (faulting) that may be present. Given the relatively consistent geological structure of the mine, the identification of the positioning of marker bands allows geological boundaries between the marker bands and the target ore to be predicted.

The manual inspection of the geophysical data is labour intensive and errors or difficulties with reassessing results can arise.

It is also known to apply machine learning techniques, and in particular Gaussian processes, to automatically detect characteristic signatures of target features in geophysical data sets such as natural gamma logs. An example of this process is described Silversides, K L, Melkumyan, A, Wyman, D A, Hatherly, P J, Nettleton, E (2011) Detection of Geological Structure using Gamma Logs for Autonomous Mining. In IEEE International Conference on Robotics and Automation, 9-13 May, 2011. Shanghai, China, pp 1577-1582, the contents of which are hereby incorporated in their entirety into this specification by reference. While the use of such techniques improves on the efficiency of manual inspection techniques, the process of preparing training libraries and training the Gaussian process is a difficult and slow process and ultimately impacts on the accuracy of the predictions that can be made.

It would be desirable to provide systems and methods for processing geophysical data to identify target features that are more efficient and/or more accurate than existing systems and methods. Alternatively, or in addition, it would be desirable to provide a useful alternative to known systems and methods processing geophysical data to identify target features.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

Generally speaking, aspects of the present invention relate to systems and methods for processing geophysical data to either identify features of interest in the geophysical data, or to enable features of interest in the geophysical data to be identified.

More specifically, one aspect of the invention provides a computer implemented method for generating a probabilistic model usable to identify instances of a target feature in geophysical data sets stored on a memory device, the computer implemented method including:

(a) using a computer processing unit to generate a probabilistic model from a training library, the model for use in identifying instances of the target feature in the geophysical data sets, the training library including one or more target examples, each target example including a signature being indicative of the target feature, and one or more non-target examples, each non-target example including a signature being indicative of a non-target feature;

(b) applying, using the computer processing unit, the probabilistic model to one or more of the geophysical data sets to generate a plurality of results, each result associated with a processed geophysical data set and indicating a level of certainty as to whether that geophysical data set includes the target feature;

(c) processing, using the computer processing unit, the set of results according to an acceptability criteria in order to identify a plurality of candidate results, the candidate results being results associated with data sets having potential significance to the performance of the probabilistic model;

(d) receiving a selection of one or more of the candidate results and for the or each selected candidate result displaying on a display the result and its associated geophysical data set to assist a user in making an assessment as to whether or not the probabilistic model is an acceptable model for the processing of the geophysical data sets;

(e) receiving from a user an assessment as to whether or not the probabilistic model is an acceptable model; and (f) if the assessment received indicates the probabilistic model is an acceptable model for processing the geophysical data, outputting the probabilistic model and/or the training library.

Using the computer processing unit to generate the probabilistic model from the training library may include applying Gaussian processes to the training library.

The acceptability criteria may be based on a standard deviation of the plurality of results and/or on the occurrence of results which cross a predetermined threshold when the results are considered in conjunction with the standard deviation.

In the latter case, the predetermined threshold is 0.5, and consideration of a result in conjunction with the standard deviation may include:

if the result is greater than 0.5, subtracting the standard deviation to the result to see whether the resulting value is less than 0.5; or if the output is less than 0.5, adding the standard deviation to the result to see whether the resulting value is greater than 0.5.

If the assessment received at step (e) indicates the probabilistic model is not an acceptable model for the processing of the geophysical data, the method may further include:

receiving a selection of at least one example to be added to the training library, the or each example including a signature of either a target or non-target feature and being included in a data set associated with a candidate result;

modifying the training library by adding the at least one example; and repeating steps (a) to (f) in respect of the modified training library.

Prior to adding the at least one example to the training library the method may further include, for each example selected to be added to the training library:

displaying a comparison of the selected example with one or more examples included in the training library to allow the user to make a compatibility assessment as to whether the selected example is compatible with the examples included the training library;

receiving an assessment as to whether the selected example is compatible with the examples included in the training library; and only modifying the training library by adding the selected example if the selected example is assessed as being compatible with the examples in the training library.

If the assessment received at step (e) indicates the probabilistic model is not an acceptable model for the processing of the geophysical data, the method may further include:

presenting the training library examples to the user;

receiving a selection of one or more examples for removal from the training library;

modifying the training library by removing the example or examples selected for removal; and repeating steps (a) to (f) in respect of the modified training library.

The training library may be an initial training library and the method may further include generating the initial training library by:

receiving a user selection of at least one target example from the geophysical data sets;

receiving a user selection at least one non-target example from the geophysical data sets; and adding the user selected target and non-target examples to the initial training library.

Each geophysical data set may be a natural gamma data log including natural gamma measurements taken from a drill hole.

The target feature to be identified in each natural gamma log may be the existence of one or more marker shale bands.

In a second aspect the present invention provides a computer implemented method for identifying instances of a target feature in geophysical data sets stored on a memory device, the geophysical data sets having associated surface coordinates, the computer implemented method including:

implementing a computer implemented method as described above in order to generate a probabilistic model;

applying the probabilistic model to the geophysical data sets to generate a classification result for each data set, each classification result indicating whether the associated data set includes the target feature; and outputting at least those classification results which indicate that the associated data set includes the target feature, together with information enabling the surface coordinates of the geophysical data set associated with the result to be determined A classification result may be deemed to indicate that the associated data set includes the target feature if the result is above a predetermined threshold.

A classification result may be deemed to indicate that the associated data set includes the target feature if the result is above a predetermined threshold after a standard deviation of the classification results is subtracted from the predetermined threshold.

The predetermined threshold may be 0.5.

In a further aspect the present invention provides a computer implemented method for identifying the location of ore in a mining environment, said method including:

acquiring a plurality of geophysical data sets from the mining environment, each geophysical data set being associated with a drill hole having known surface coordinates;

implementing a computer implemented method as described above to identify instances of a target feature occurring in the geophysical data sets;

using the classification results to predict a depth at which ore is likely to be found; and outputting depth data representing said predicted depth together with information enabling surface coordinates associated with said depth to be determined In a further aspect the present invention provides a method of mining including:

identifying the location of ore in a mining environment by implementing a computer implemented method as described above; and extracting ore from the identified location.

In a further aspect the present invention provides a non-transient computer readable storage media including instructions which, when executed, facilitate any of the computer implemented methods described above.

In a further aspect the present invention provides a system including:

a processing unit;

a memory; and one or more input/output devices, wherein the processing unit is connected with the memory and one or more input output devices by a communications bus, and wherein the memory stores the geophysical data sets and instructions executable by the processing unit to facilitate any of the computer implemented methods described above.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIG. 3A provides an example of a natural gamma log section including a natural gamma signature of a target feature (being, in this instance, the presence of two marker shale bands);

FIGS. 3B and 3C provide examples of a natural gamma log sections including natural gamma signatures of the same target feature shown in FIG. 3A, the signatures shown in FIGS. 3B and 3C being distorted compared to the signature shown in FIG. 3A;

DETAILED DESCRIPTION OF THE EMBODIMENTS

The present invention is directed to systems and methods for processing geophysical data to identify the existence and location of target features. Generally speaking, the identification of the location of certain target geological features in a mine environment allows for a model of the subsurface geology of the mine to be generated. This model, in turn, can be used in order to plan and execute mining operations.

Examples of data that can be used include any variety of well logging data, such as and not limited to lithology logs such as gamma ray logs, porosity or density logs, and electrical logs. Different features can be obtained from the different types of logs, and can then in turn be used as indicators for different geological formations or aspects of interest. For example, spontaneous potential logs can be used to detect permeable beds and to estimate clay content and formation water salinity, and gamma logs can be used to distinguish between sands and shales in siliciclastic rocks.

Figure 1:
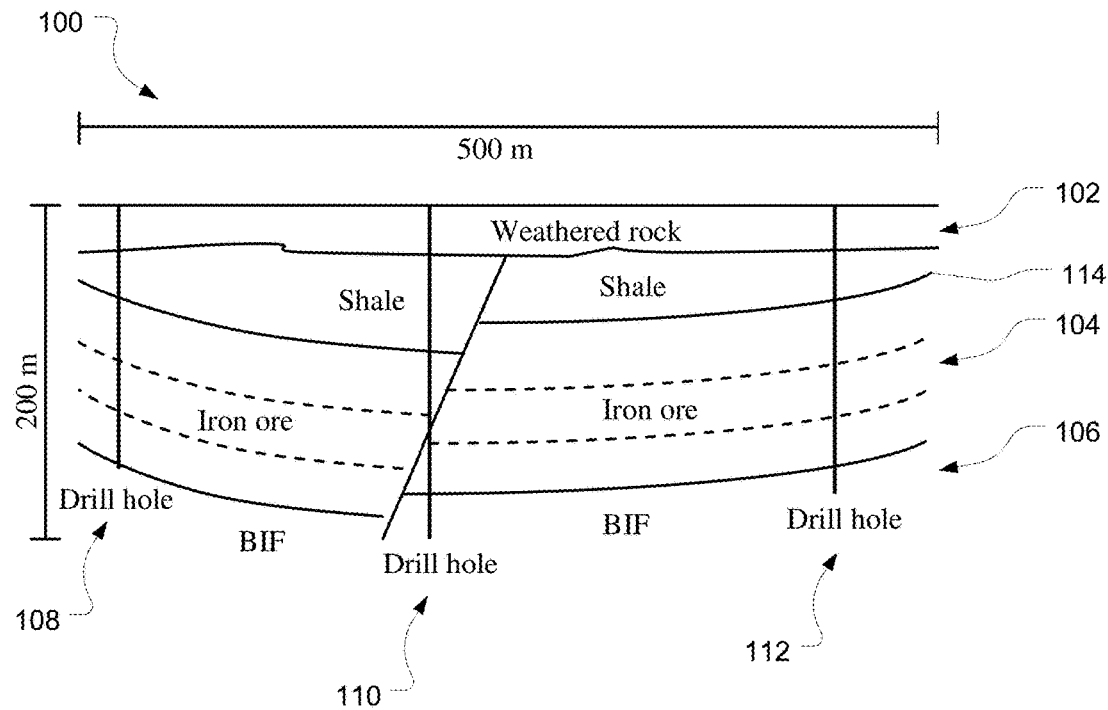
FIG. 1 provides a depiction of a cross section of part of a stratiform mine.

For the purposes of explanation, specific application of the principles of the invention will be described with respect to identifying the location of iron-ore in stratiform iron-ore mines such as those found in the Hamersley Ranges in Western Australia. FIG. 1 provides a cross-sectional depiction of part of a stratiform iron ore mine 100 found in the Hamersley Ranges of Western Australia. FIG. 1 depicts an area of the mine approximately 500 m across and 200 m deep.

By way of broad overview, such stratiform mines have (as a general proposition) a relatively consistent geological structure including a band of weathered rock 102, a band of shale 104, a band of iron ore 106, and a band of banded iron formation 106. Three drill holes 108, 110, and 112 are also depicted.

In particular, the consistency of the interlayer marker shale bands can be used to identify the stratigraphic location of the banded iron formations and banded iron formation hosted ore (see, for example, Thorne W, Hagemannm S, Webb, Clout J (2008) Banded iron formation-related iron ore deposits of the Hamersley Province, Western Australia. In: Hagemannm S, Rosiere C, Gutzmer J, Beukes N J (ed) Banded Iron Formation-Related High Grade Iron Ore, Rev Econ Geol 15: 197-221 and Laselles D F (2000) Marra Mamba iron formation stratigraphy in the eastern Chichester Range, Western Australia. Aust J Earth Sci 47: 799-806).

By identifying the location and depth of the marker shale band(s) (i.e. the target feature) at various discrete points throughout the mine environment, the boundary between the marker shale bands and the iron ore (and, accordingly, the location of the iron ore) across the whole mine environment can be predicted. Once the location of the iron ore has been determined, mining operations can be planned and executed accordingly.

The present embodiment of the invention takes advantage of the fact that the marker shale bands exhibit a distinct natural gamma signature.

Computer Processing System

Figure 2:
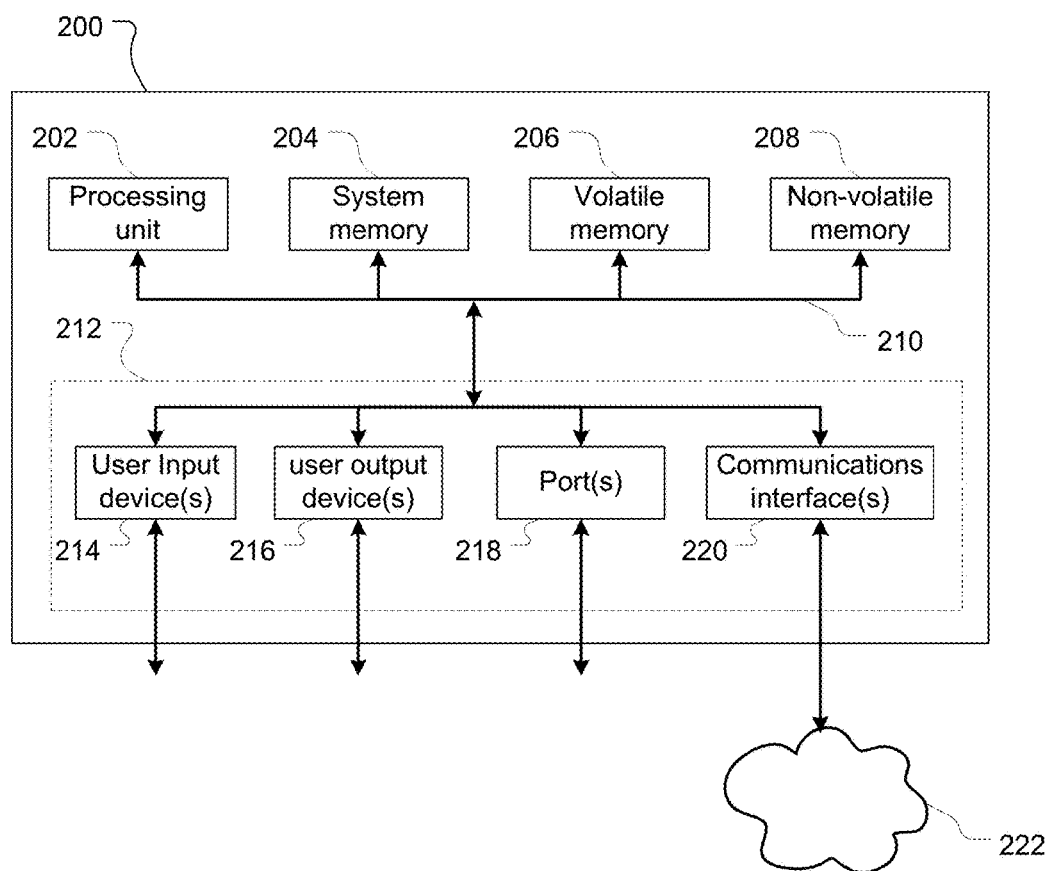
FIG. 2 provides a depiction of a computer processing device suitable for use with the present invention.

In one embodiment the present invention is a computer implemented method. A block diagram of a computer processing system 200 suitable for implementing the computer implemented method is depicted at FIG. 2.

The computer processing device 200 includes at least one processing unit 202. The processing unit 202 may include a single processing device (e.g. a microprocessor or other computational device), or may include a plurality of processing devices. In some instances all processing will be performed by processing unit 202, however in other instances processing may also, or alternatively, be performed by remote processing devices accessible and useable (either in a shared or dedicated manner) by the device 200.

Through a communications bus 210 the processing unit 202 is in data communication with a system memory 204 (e.g. a BIOS), volatile memory 206 (e.g. random access memory including one or more DRAM modules), and non-volatile memory 208 (e.g. one or more hard disk drives, solid state drives, and/or ROM devices such EPROMs). Instructions and data to control operation of the processing unit 202 are stored on the system, volatile, and/or non-volatile memory 202, 204, and 206.

The computer processing device 200 also includes one or more input/output interfaces (indicated generally by 212) which interface with a plurality of input/output devices. As will be appreciated, a wide variety of input/output devices may be used, including intelligent input/output devices having their own memory and/or processing units. By way of non-limiting example, the device 200 may include: one or more user input devices 214 (e.g. keyboard, mouse, a touch-screen, trackpad, microphone, etc); one or more user output devices 216 (e.g. CRT display, LCD display, LED display, plasma display, touch screen, speaker, etc); one or more ports 218 for interfacing with external devices such as drives and memory (e.g. USB ports, Firewire ports, eSata ports, serial ports, parallel ports, SD card port, Compact Flash port, etc); and one or more communications interfaces 220 (e.g. a Network Interface Card allowing for wired or wireless connection to a communications network 222 such as a local or wide area network).

Communication with the communications network 110 (and other devices connected thereto) will typically be by the protocols set out in the layers of the OSI model of computer networking. For example, applications/software programs being executed by the processing unit 202 may communicate using one or more transport protocols, e.g. the Transmission Control Protocol (TCP, defined in RFC 793) or the User Datagram Protocol (UDP, defined in RFC 768).

The computer processing device 200 will run one or more applications to allow a user to operate the device 200. Such applications will typically include at least an operating system (such as Microsoft Windows®, Apple OSX, Unix, or Linux). In order to provide for the specific functionality required by the invention a mathematical processing application, such as MathWorks MATLAB, may also be installed. Alternatively, the invention may be enabled by a specifically programmed and dedicated application. In more general terms, the computer implemented method of the invention will typically be implemented by a computer processing device processing a sequence of instructions.

It will be understood that this description of a computer processing device is only one example of possible devices which could be used to implement the invention. The functions represented by the blocks in FIG. 2 may be provided through shared or dedicated hardware which may in turn be locally or remotely accessed.

Data Acquisition

As an initial step, geophysical data regarding the mine is acquired. In the present context the geophysical data used is natural gamma data, and is acquired by natural gamma logging processes.

Broadly speaking, natural gamma logging involves drilling a number of holes into the surface of the mine area (or using an existing exploration holes). In iron ore mines such holes typically have a diameter of approximately 14 cm and can be over 200 m deep. Such holes may be drilled, for example, by using diamond, rotary, or percussive drilling methods. A natural gamma detector is then lowered down each hole on a cable to a predetermined depth before being raised back up the hole at a set speed so that periodic measurements can be taken at set intervals (e.g. every 10 cm). As different types of rock naturally emit different amounts and different spectra of gamma radiation, the natural gamma log of a given drill hole can be analysed to identify different geological features and the depth at which they occur.

FIG. 3A illustrates a section of a natural gamma log 300 of a drill hole, showing the gamma recorded (in API units) against the depth in the drill hole. Log 300 shows the natural gamma signature of a typical AS1 and AS2 shale formation, indicated by arrow 302. The AS1 and AS2 shale formation includes two double peak gamma formations (each double peak indicating a shale). In the example stratiform mine discussed, the AS1 and AS2 shale formation consistently indicates a boundary region between shale and iron ore (e.g. boundary 114 in FIG. 1).

FIGS. 3B and 3C illustrate additional natural gamma log sections 310 and 320 taken from drill holes proximate the drill hole from which log 300 was taken. Logs 310 and 320 show variations in the AS1 and AS2 shale gamma signature, indicated by arrows 312 and 322 respectively.

The geophysical dataset will typically be stored on memory (such as non-volatile memory 208) for processing by the processing unit 202. The dataset may be communicated to the computer processing device in a number of ways. For example, the dataset may be communicated over network 222 or copied off an external memory device connected via a port 218. Further alternatively, the relevant detection unit(s) may communicate detected data directly to a memory (such as 218) of the computer processing device (again, either via a communications interface 220 or via connection of the detector to the computer processing device 200 by a port 218.)

Data Processing

Traditionally, natural gamma logs such as those shown in FIG. 3 are visually inspected by a skilled geologist or geophysicist. By applying their knowledge of the characteristic signatures of particular shales and, ordinarily, their intuitive knowledge of the local environment (e.g. the typical widths/magnitudes of shale bands, the relative positioning of shale bands with respect to other bands etc), the geologist can interpret the gamma logs to determine the positions of various geological features/bands. Once the logs have been processed, the positions of various marker features (e.g. marker shales) at individual drill locations are integrated into three dimensional models of the subsurface geology of the mine (see, for example, Jones H, Walraven F, Knott G G (1973) Natural gamma logging as an aid to iron ore exploration in the Pilbara region of Western Australia. Australasian Institute of Mining and Metallurgy Annual Conference (Perth, Australia): 53-60).

Given a mine can have hundreds of thousands of meters of logs to be processed, however, the inspection and interpretation of the logs is a time- and skill-intensive task.

In order to facilitate the interpretation of geophysical data logs and subsurface geology mapping, various machine learning techniques have been considered (see, for example, Borsaru M, Zhoua B, Aizawa T, Karashima H, Hashimoto T (2006) Automated lithology prediction from PGNAA and other geophysical data logs. Appl Radiat Isotopes 64: 272-282). Two examples of this are self-organised mapping and fuzzy logic.

Self-organised mapping is a neural network technique that can be used to process geophysical data into clusters to predict rock type (see, for example, Baldwin J L, Bateman R M, Wheatley, C L (1990) Application of a neural network to the problem of mineral identification from well logs. Log Anal: 279-293, and Klose C D (2006) Self-organizing maps for geoscientific data analysis: geological interpretation of multidimensional geophysical data. Comput Geosci 10: 265-277).

Fuzzy logic uses a set of rules that define various boundaries between classes. The approach allows a data point or drill hole interval to partly belong to multiple categories. Successive sets of interim results are then used again to classify lithology from a combination of geophysical data logs, with different rules applying to each input step (see, for example, Chang H, Chen H, Fang J, (1997) Lithology determination from well logs with fuzzy associative memory neural network. IEEE Trans. Geosci. Remote Sensing 35: 773-780 and Kadkhodaie Ilkhchi A, Rezaee M, Moallemi S A (2006) A fuzzy logic approach for estimation of permeability and rock type from conventional well log data: an example from the Kangan reservoir in the Iran Offshore Gas Field. J Geophys Eng 3: 356-369).

Probabilistic Estimation

In order to increase the efficiency of the process of identifying desired signatures in the geophysical data logs, probabilistic estimation such as Kriging or Gaussian processes may be used. Gaussian processes provide a probabilistic method of modelling functions representing quantities of interest (e.g. iron grade, rock type or mineralogy) within a given set of data. Mathematically, a Gaussian Process is an infinite collection of random variables, any finite number of which has a joint Gaussian distribution.

At a high level, machine learning using Gaussian processes consists of two steps: a training step in which a probabilistic model is generated, and an inference step in which the model is used to interpret/classify data.

Gaussian processes usually contain initially unknown hyperparameters and the training step is aimed at optimizing those hyperparameters to result in a probabilistic model that best represents a training library. The hyperparameters used in the applications of Gaussian processes include length scales, which describe the rate of change of the output, and noise variance, which describes the amount of noise in the dataset.

Once the optimal hyperparameters for the training library are defined, the resulting model can be used during the inference step to predict the values of the function of interest at new locations.

More information on Gaussian processes can be found in, for example, in Rasmussen C E, Williams C K I (2006) Gaussian Processes for Machine Learning. Springer Science+Business Media, L L C and Bishop C M (2006) Pattern Recognition and Machine Learning. Springer: Berlin.

In order to illustrate the features and advantages of the invention, two separate methods for using Gaussian processes to identifying target features in geophysical datasets will be discussed. The first method described is a traditional methodology in which the training library for the Gaussian processes is manually prepared by an operator. In the second example, which is in accordance with an embodiment of the invention, an active learning approach is adopted.

Manual Training Library Preparation

In the first example, a training library was manually prepared using a method similar to that described in Silversides, K L, Melkumyan, A, Wyman, D A, Hatherly, P J, Nettleton, E (2011) Detection of Geological Structure using Gamma Logs for Autonomous Mining. In IEEE International Conference on Robotics and Automation, 9-13 May, 2011. Shanghai, China, pp 1577-1582, the contents of which are herby incorporated in their entirety into this specification by reference.

Figure 4C:
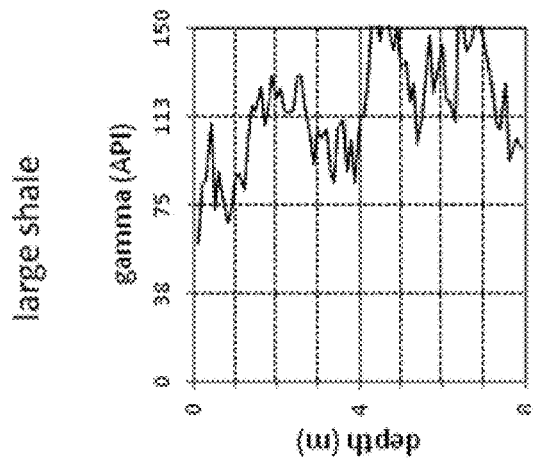
FIGS. 4A to 4C provide examples of natural gamma log sections which include natural gamma signatures of non-target features.
Figure 4B:
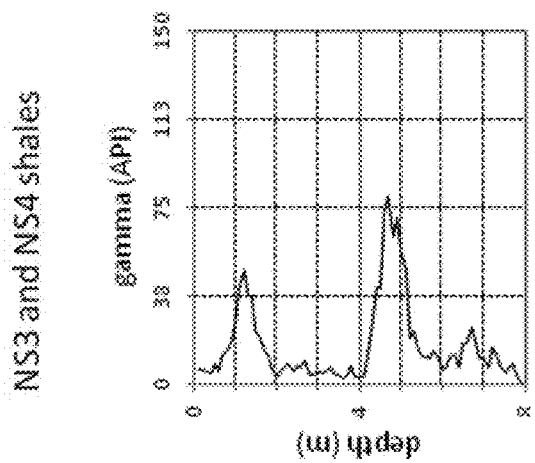
Figure 4A:
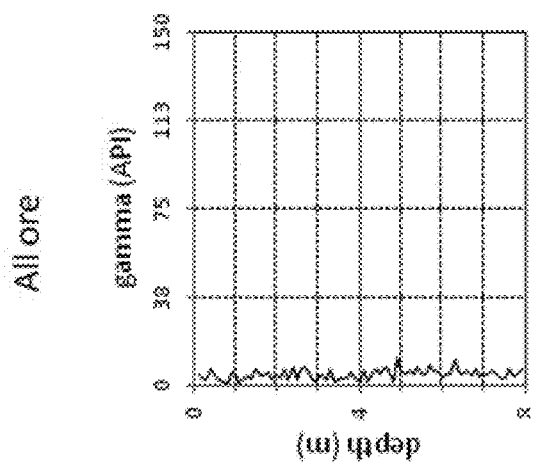
Figure 5A:
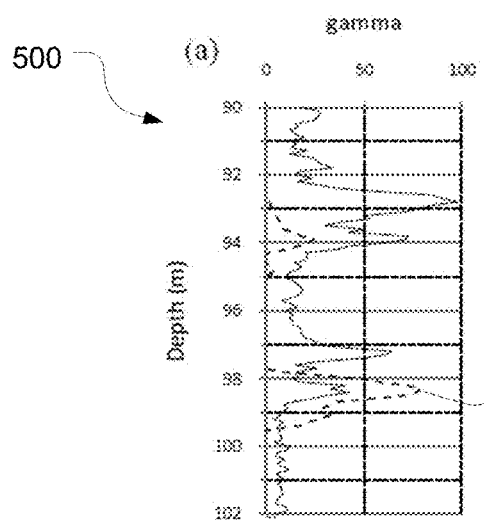
FIGS. 5A to 5D show graphs of log sections in which the natural gamma readings for the log sections are plotted against the output of the Gaussian process for the log sections.
Figure 5B:
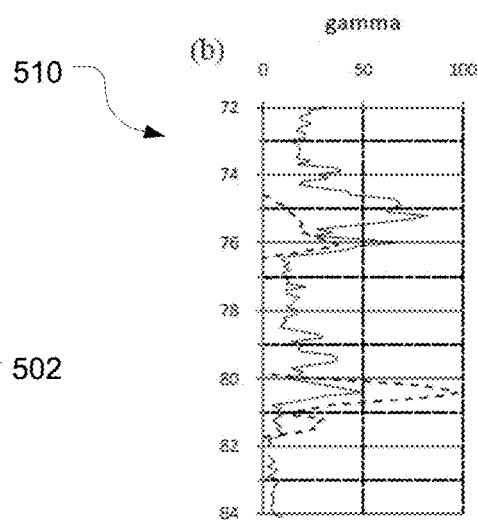
Figure 5C:
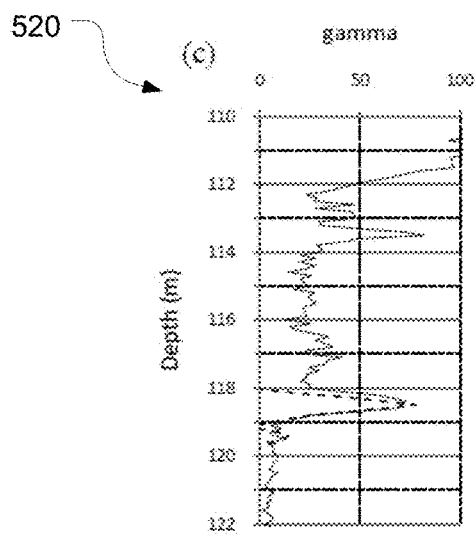
Figure 5D:
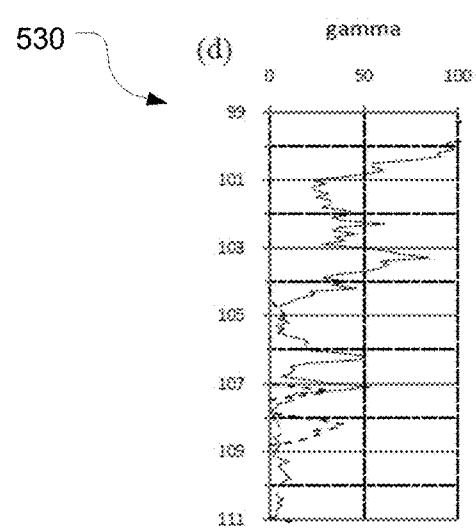

Construction of the initial training library involved selecting a number of typical signatures of the target feature intended for identification—i.e. a number of the AS1 and AS2 shale natural gamma signatures as depicted in FIGS. 3A to 3C—together with signatures of other features (e.g. rocks) in the stratigraphic sequence of the area. FIGS. 4A to 4C provide example sections of gamma logs which show gamma signatures of non-target features. FIG. 4A shows a gamma signature of ore, FIG. 4B shows a gamma signature of NS3 and NS4 shales, and FIG. 4C shows a gamma signature of large shale.

The signature examples selected for inclusion in the initial training library included eight exemplary signatures: four positive signatures representative of the target feature (the AS1 and AS2 feature) and four negative signatures representative of other or non-target features. The example signatures were included in 8 meter sections of drill hole gamma logs with natural gamma measurements taken at 10 cm intervals. For the positive examples (i.e. the examples of the features to be identified—in this instance the signature of the AS1 and AS2 shale) the 8 m sections were selected so that the peak of the AS1 shale signature was located 2 meters above the base of each section. A corresponding output file for the library was also prepared assigning gamma log sections known to contain the AS1 and AS2 shale signature an output of 1 and sections without the AS1 and AS2 shale band signature an output of 0.

A Gaussian process was then used to learn the optimum hyperparameters from the training library. In order to create a Gaussian process model, a covariance function is chosen to help describe the relationship between the inputs (i.e. the example signatures) and outputs (i.e. the manual classification of the gamma log sections as including or not including the target feature signature). The covariance function also defines the number and type of hyperparameters that are needed for the model. In the present example a single length scale squared exponential covariance function was selected and random numbers used as initial hyperparameters. As will be appreciated, alternative covariance functions could be used, for example Observation Angle Dependent (see, for example, A. Melkumyan, E. Nettleton, An Observation Angle Dependent Nonstationary Covariance Function for Gaussian Process Regression, International Conference on Neural Information Processing (ICONIP), Lecture Notes in Computer Science 5863, 2009, pp. 331-339), Matern, Exponential, Rational Quadratic, and Neural Network (see, for example, Rasmussen C E, Williams C K I (2006) Gaussian Processes for Machine Learning. Springer) covariance functions. In order to ensure the Gaussian process obtained a good local minimum multiple starting points were used.

A number of natural gamma logs that were not part of the initial training library were then selected for classification by the model. This classification process involves splitting each gamma log into overlapping 8 m sections, with the base of each successive section of a gamma log being lowered by 10 cm. For example, the first section for a given gamma log may be 0 m (ground level) to 8 m, the second section 0.1 m to 8.1 m, the third section 0.2 m to 8.2 m. Each individual section was then classified using the model. For each natural gamma log section the classification output is a value between 0 and 1 that describes how similar the gamma profile recorded in the gamma log section is to the gamma log sections in the library which include the target feature (i.e. the AS1 and AS2 shale signature). An output of over 0.5 (50%) was considered a positive classification that the section in question included the target feature (i.e. AS1 and AS2 signature).

In this instance, 50 gamma logs were arbitrarily selected from a different area of the mine for processing using the model. The output classifications were then manually compared to geological interpretations of the logs in order to identify areas that were misclassified or were not clearly classified. In order to facilitate this manual comparison, all log section classifications for a given log are combined to form a continuous plot of the output values relevant to that log.

Recalling that, in this instance, the positive training library examples included 8 m gamma log sections with the base of the target feature (i.e. the AS1 gamma peak) located at a depth of 2 m from the base of the section, the classification output for a given log section was also assigned a depth of 2 m from the base of that section. Returning to the example above: for section 1 of a given log covering 0 m to 8 m the classification output would be assigned a depth of 6 m; for section 2 covering 0.1 m to 8.1 m the classification output would be assigned a depth of 6.1 m; for section 3 covering 0.2 m to 8.2 m the classification output would be assigned a depth of 6.2 m; and so forth. Once combined in this way, a graph plotting the natural gamma readings for a log against the Gaussian process classifications for the sections of that gamma log (in this instance each Gaussian process output being multiplied by 100 to fit the same axis) is prepared and visually inspected. By way of illustration, four example graphs are shown at FIGS. 5A to 5D, each graph including a sold line indicating the natural gamma reading and a broken line plotting the outputs of the Gaussian process classification for that log (multiplied by 100). Graph 500 (FIG. 5A) shows a "normal" AS1 and AS2 signature correctly identified by the model; graphs 510 (FIG.

5B) and 520 (FIG. 5C) show distorted AS1 and AS2 signatures correctly identified by the model; and graph 530 (FIG. 5D) shows a distorted AS1 and AS2 signature incorrectly identified by the model.

Signatures identified as being misclassified or unclearly classified were added to the initial training library (by selecting the 8 m log section including the signature) and the new training library used to retrain the hyperparameters. This step was repeated several times (roughly 5-6).

In the course of the experiment approximately 50 training holes were used, with a total of 48 signatures in the library. As this is less than 1% of the total data set (which included natural gamma logs from 5971 holes in total) the training holes were not removed from the data set before it was processed.

On completion of the retraining processes, the optimized hyperparameters were used with the library to process all natural gamma logs from the dataset and classify each log as either including or not including the target feature (i.e. the AS1and AS2 shale signature). As noted above, the Gaussian process output for each log section is a value describing how similar the gamma profile recorded in the gamma log section is to the gamma log sections in the library which include the target feature (i.e. the AS1 and AS2 signature), with an output of over 0.5 (50%) being considered a positive classification that the section in question included an AS1 and AS2 signature.

These results were then used to give a boundary depth for each gamma log where the Gaussian process classified a boundary. In this particular instance the boundary depth was taken as being 2 meters below the Gaussian process output peak value. In the graphs of FIGS. 5A to 5D this 2 m offset is taken into account, with the graphs showing the estimated boundary depth (where present). For example, in FIG. 5A the boundary depth for the drill hole from which the log was obtained is estimated to be at approximately 98.4 m.

Once all available drill hole gamma logs have been classified as including a boundary or not, and where classified the depth of the boundary calculated, the individual data points are integrated into a three dimensional model of the subsurface geology of the mine One process by which this can be achieved is described in Jones H, Walraven F, Knott G G (1973) Natural gamma logging as an aid to iron ore exploration in the Pilbara region of Western Australia. Australasian Institute of Mining and Metallurgy Annual Conference (Perth, Australia): 53-60.

At each iteration of the training process the need to manually inspect the set of classification results of the logs selected to test the model and supplement the library with examples of logs that are inadequately classified results in a very time consuming process. Further, the time-intensiveness of the process makes it impracticable to plot and compare the entire dataset, forcing the use of an arbitrary sub-set of the data to test the model. This limits the training data that can be taken into consideration to a small sub-section of the total dataset which can result in example signatures being entirely missed, compromising the accuracy of the predictions made by the model.

Manual Approach Results

In the experiment, 5971 drill hole gamma logs were classified by the Gaussian process. The classifications were then compared to a manual geological interpretation of the mine site in order to gauge the accuracy of the classifications. The results of this comparison are shown in Table 1:

TABLE 1

| | Geological interpretation: AS1 & AS2 present | Geological interpretation AS1 & AS2 not present |
|---|---|---|
| Gaussian process: AS1 & AS2 positively classified | 9.5% | 4.7% |
| Gaussian process: AS1 & AS2 not classified | 6.3% | 79.4% |

The classified gamma logs were split into two groups: gamma logs where the Gaussian process detected the AS1 and AS2 signature (and, therefore, a boundary), and the logs where the Gaussian process did not detect the AS1 and AS2 signature.

The Gaussian process classified 853 gamma logs as having the AS1 and AS2 signature. Of the gamma logs classified by the Gaussian process as having the AS1 and AS2 signature, 66.7% (≈569 or 9.5% of the total number of holes) correctly represented the depth of the AS1 and AS2 boundary, and 33.3% (≈281 or 4.7% of the total number of holes) of the boundaries were incorrectly identified.

Of the 5118 gamma logs which the Gaussian process did not classify as having the AS1 and AS2 signature, 92.7% (≈4744 or 79.4% of the total number of holes) were correctly classified and did not in fact contain the AS1 and AS2 signature. The remaining 7.43% (≈380 or 6.3% of the total number of holes) were incorrectly classified by the Gaussian process with there being no AS1 and AS2 signature in the gamma logs.

While the overall accuracy was good, with 88.9% logs/holes being correctly characterised, only two thirds of the logs/holes identified as containing the AS1 and AS2 boundary were correct.

Active Learning Approach

In order to increase the efficiency and accuracy of the process described above, embodiments of the present invention apply an active learning approach for improving the training process—and in particular the process of selecting exemplary signatures to add to (or remove from) the training library.

Generally speaking, using an active learning approach the training library is generated (and the model trained) by a user who selects actions or makes queries based on output from the application of the previous training library to the dataset. The data on which selections are made can be chosen based on different criteria, such as poor performance, low confidence and or the quantity of data available. For a general discussion of active learning techniques see, for example, Cohn D A, Ghahramani Z, Jordan M I (1996) Active Learning with Statistical Models. J Artif Intell Res 4: 129-145.

The active learning approach of embodiments of the invention takes advantage of the prediction uncertainty (provided by Gaussian processes for each output) in order to improve both the selection of signature examples for inclusion in the training library, and the time it takes to build a training library. Instead of an entirely manual process for selecting gamma logs (or the signatures included therein) for inclusion in the library, the active learning method uses probability criteria to automatically provide guidance to a user as to which logs the library does not have sufficient information to correctly classify, and accordingly which should be considered further—either for inclusion in the training library or for removal from the training library. This is in contrast to the manual process described above in which a user needs to plot a random selection of log classifications and visually inspect those classifications hoping to find further log examples for inclusion in the training library.

Figure 6:
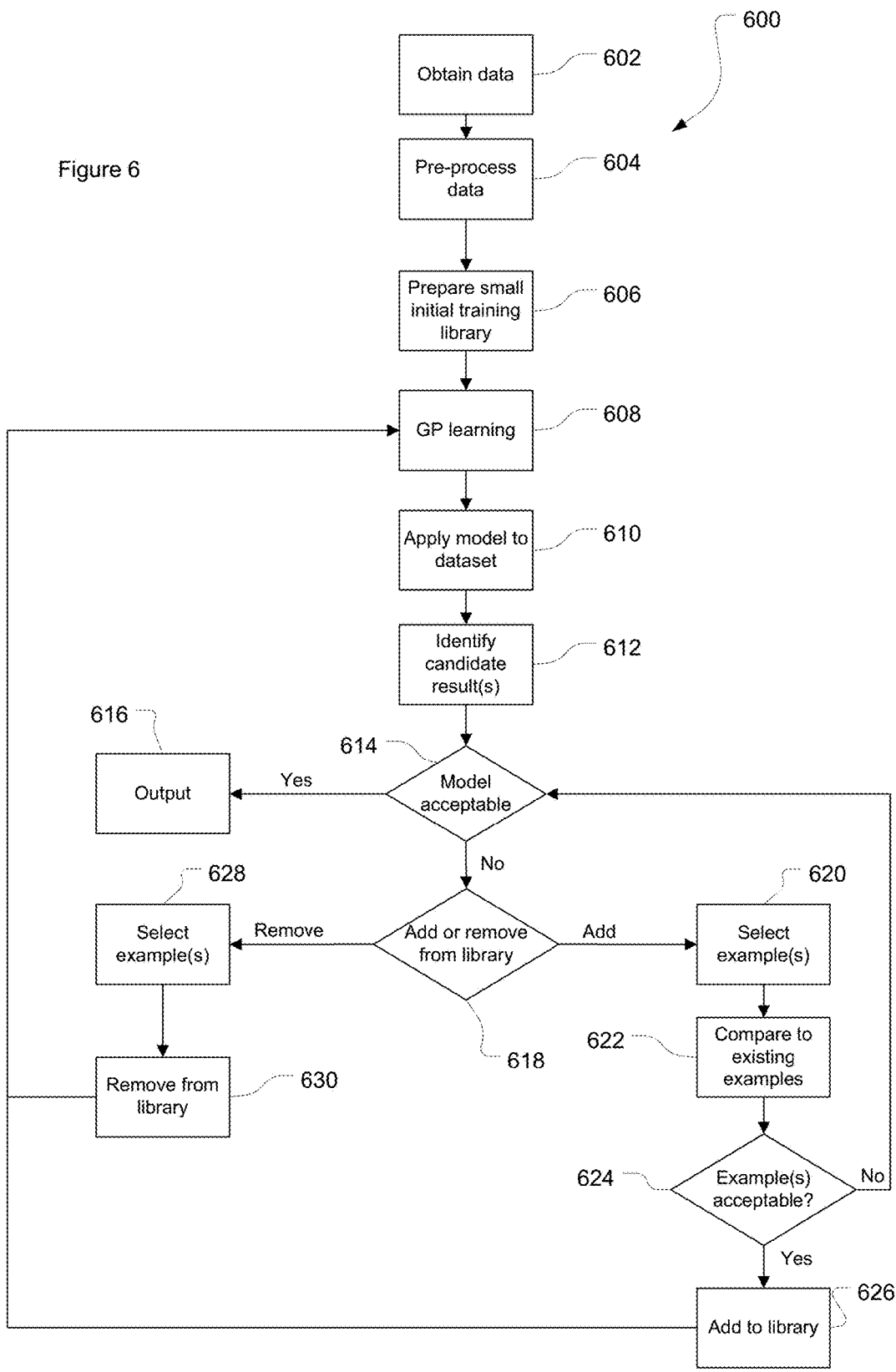
FIG. 6 shows a flow chart of a computer implemented for generating a training library for a Gaussian process in accordance with an embodiment of the invention.

The steps involved in the active learning process are set out in flowchart 600 as shown in FIG. 6. These steps are undertaken using a computer processing device such as device 200 depicted in FIG. 2 and described above. The steps will be described both generally and with reference to an experiment carried out using the same data set and classification goals as described above with respect to traditional Gaussian processes—i.e. a data set including 5971 drill hole gamma logs, and the analysis being undertaken with a view to identifying the existence and locations of the AS1 and AS2 gamma signature.

At step 602, geophysical data for use in the process is acquired and stored on a memory device accessible by device 200. The memory device may, for example, be the non-volatile memory 208, or an external memory device accessible via, for example, a port 218 or communications interface 222. In the experiment, the data acquired included 5971 drill hole gamma logs obtained by natural gamma logging of drill holes, with natural gamma measurements taken at 10 cm intervals.

At step 604, the processing unit 202 is operated to pre-process the raw data for use. In the present experiment this included processing the data to remove DC bias.

At step 606 a small initial training library is prepared by user selection of a small number of examples from the data set. The examples include selection of examples of both the target feature signature (i.e. examples of the signature which the model will be trained to recognise) and of non-target features (or signatures thereof). An output file is also generated in which the classification of the training library examples is recorded. The output file is also stored in a memory device (such as non-volatile memory 208).

In the experiment the examples selected from the dataset were 8 meter sections of the natural gamma logs. The examples selected for inclusion in the initial training library included four gamma log sections which included an AS1 and AS2 gamma signature, and 4 gamma log sections which did not. The corresponding output file for the training library was also prepared assigning gamma log sections known to contain the AS1 and AS2 shale signature an output of 1 and gamma log sections without the AS1 and AS2 shale band signature an output of 0.

At step 608 the processing unit 202 is operated to process the initial training library using Gaussian processes in order to learn the optimal hyperparameters of the initial training library. In the specific example a single length scale squared exponential covariance function was used.

At step 610, the processing unit 202 is operated to process and classify a large proportion, or all, of geophysical data logs using the Gaussian process model resulting from training step 608. In the present example the model was used to classify all 5971 natural gamma logs as either including or not including the target feature (i.e. the AS1 and AS2 signature). The processing of the natural gamma logs is as described above, involving each gamma log being split into overlapping 8 m sections (each successive 8 m section being offset by 10 cm from its predecessor), classifying each section using the Gaussian process model, and assigning the Gaussian process output for a given section to a depth of 1 meter above the base of that section. The output of this step is, for each natural gamma log classified, a plurality of output values between 0 and 1 (taken from the 8 m sections of the gamma log) assigned along the depth of the drill hole log (as per the Gaussian process output lines shown in broken outline in FIGS. 5A to 5D). The standard deviation of the output results is also calculated.

At step 612, the classification results from step 610 are displayed in accordance with one or more acceptability criteria in order to identify and draw the user's attention to one or more candidate results which, based on one or more criteria, are likely to be a significant factor in the acceptability of the model/results obtained. By analysing one or more of the candidate results the user can make an assessment as to whether the model (and, accordingly, the training library used to train the model) is acceptable or not, and if not make a determination as to how best to improve the model (e.g. by adding or removing examples from the training library).

In the present embodiment, two acceptability criteria were used: the standard deviation of the output and the accuracy of the classifications. Generally speaking, these criteria were used in the basis that the predictions (and therefore the model) may be considered acceptable if the uncertain outputs are predominantly logs (or log sections) which are distorted or unusual and which may resist classification regardless of how well the model was trained. Conversely, where uncertain outputs include logs (or, more particularly, log sections) that should clearly be identified as either including the target feature or not including the target feature, the predictions may not be considered acceptable and retraining of the model appropriate.

It will be appreciated that additional or alternative acceptability criteria could be applied. By way of example, one such criterion may involve the identification of results which do not agree with surrounding results. For example, and maintaining the context of identifying an AS1 and AS2 feature in gamma logs from stratiform mines, if the results indicate that a particular log does include the AS1 and AS2 feature but logs from surrounding drill holes do not, this may flag that the log not including the feature should be a candidate for further consideration/analysis.

With respect to the standard deviation acceptability criterion, the goal is a state where the overall standard deviation for the classification outputs is low enough that most logs are definitively classified as either including the signature of interest (i.e. the AS1 and AS2 signature) or not. In the present example the target was a standard deviation of 0.4 or less. In applying this criterion the computer processing device is operated to list the output results (e.g. via a display device) ordered according to their standard deviation. This presents the results to a user in a way that allows the user to easily identify results that according to the criterion are the most likely to be causing classification problems. From the ordered output results the user can, if desired, select specific results to analyse as discussed below.

If the standard deviation of the result set is considered to be acceptable (i.e. reaches a value that does not result in too many results crossing the 0.5 threshold when adding/subtracting the standard deviation) the second acceptability criterion may be considered—namely the accuracy of the log section classifications. Under this acceptability criterion the output results are listed to draw the user's attention to those logs that are not clearly classified as being in one category or the other. Such logs are identified according to whether the prediction for the log exceeds one or more predefined thresholds. In this instance the thresholds selected were 0.5 plus the standard deviation and 0.5 minus the standard deviation, with those results falling between these values being considered uncertain. Of these uncertain results, the outputs were listed in order of those falling closest to 0.5 to those further away from 0.5. These threshold values are selected on the basis that uncertain results are those that cross the 0.5 boundary when the standard deviation is added (for outputs of less than 0.5) or subtracted (for outputs of greater than 0.5). For example, if an output is below 0.5 and adding the standard deviation results in the output being above 0.5 it is considered uncertain (though if after adding the standard deviation the output is still below 0.5 it is considered certain). Conversely, if an output is above 0.5 and subtracting the standard deviation takes the output to below 0.5 it is considered uncertain (though if after subtraction of the standard deviation the output is still greater than 0.5 it is considered certain). Once again, from the ordered output results the user can, if desired, select specific results to analyse as discussed below.

Under this criterion (i.e. accuracy of the log classifications), an indication that the model and training library may be acceptable is when the number of logs with an output falling between the threshold values (i.e. falling between 0.5+/− the standard deviation) no longer decreases (despite adding further examples to the training library) and the logs still classified as uncertain generally include only distorted logs.

Regardless of the criterion selected, the processing unit 202 may be configured to list all results (ordered appropriately), or may be configured only to list those results above/or below a certain threshold in order to limit the listed results to those that are likely to be of most interest to the user. In the embodiment described, candidate results for consideration are presented to the user by virtue of their positions at the top of an ordered list. Alternative means of drawing attention to candidate results are, of course, possible, such as by highlighting or otherwise visually marking the candidate results to identify them from the rest of the results.

Figure 7A:
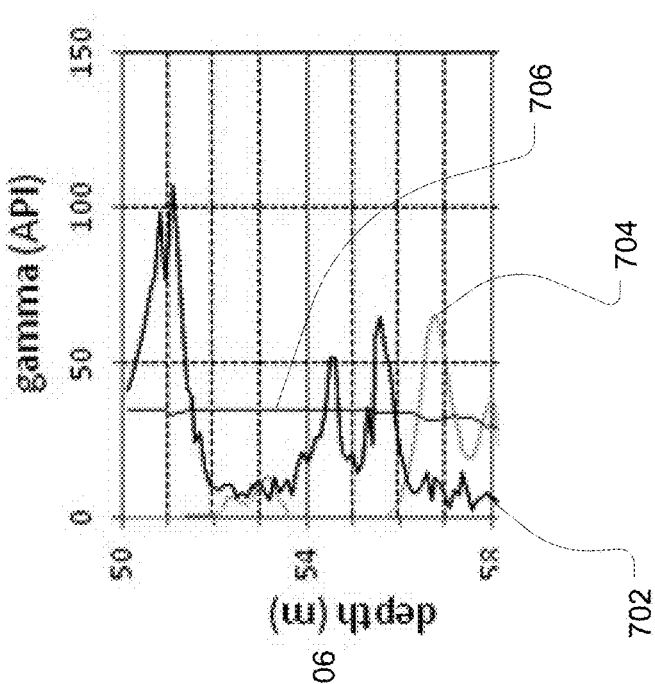
FIGS. 7A to 7C provide example graphs in which the natural gamma readings are plotted against the Gaussian process outputs and standard deviation.
Figure 7B:
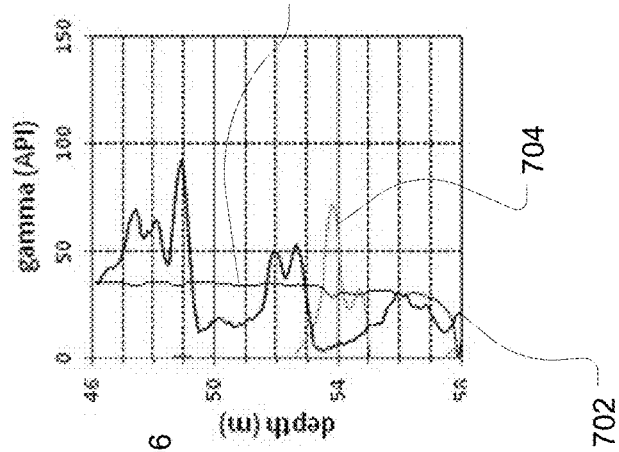
Figure 7C:
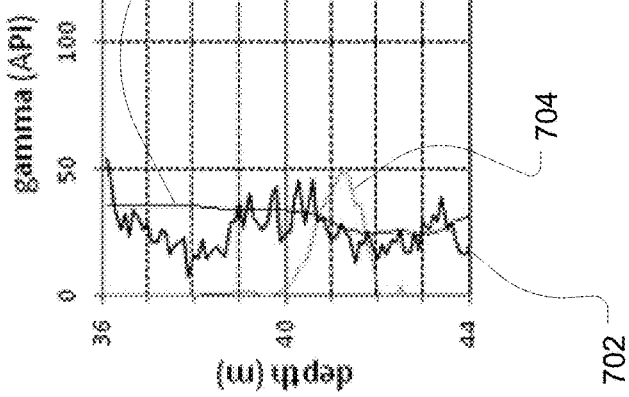

If one or more candidate results are selected for further analysis by the user, the computer processing device displays a graph of the gamma readings for the log associated with the result plotted against the classification results of the log sections relevant to that log and the standard deviation of the result set. FIGS. 7A to 7C provide examples of such graphs. Each of FIGS. 7A to 7C shows a graph of a log section in which the natural gamma reading 702, the Gaussian process output 704, and the standard deviation 706 are plotted (the Gaussian process output and standard deviation being multiplied by 100 to enable them to be viewed on the same graph).

This allows the user to quickly analyse selected candidate results and determine whether the model is acceptable corrective action can and should be taken (e.g. by adding or removing log sections/signatures to the training library), or whether the training library should not be changed and the model is acceptable.

At step 614 the user makes an assessment as to whether the predictions made by the model (and training library) are acceptable or whether corrective action is required. This assessment is based on the identified candidate results displayed at step 612 (either by way of ordered result lists or otherwise) and/or inspection of graphs plotting gamma readings against corresponding Gaussian process outputs (as described below) of one or more of the candidate results. The decision may be made with reference to the identified candidate results alone (and without inspection of result graphs) if previous iterations of the process have occurred and the user recognises candidate results as those that do not in fact require further consideration (e.g. due to being results in respect of distorted or otherwise problematic log sections that defy classification).

If, at step 614, the predictions made by the model are determined by the user to be acceptable, the training process is considered complete and the results output at step 616. Step 616 is discussed further below. It is noted that if the predictions are acceptable the model can then be used to process the geophysical dataset with an acceptable level of accuracy. To this end, both the model and training library are useful outputs/results in their own right.

Alternatively, if the predictions are not determined to be acceptable by the user at step 614, the user commences the process of modifying the training library by adding or removing examples (before repeating steps 608 onwards with a modified training library).

At step 618, the user first decides whether to modify the existing training library by adding additional examples or removing existing examples. In general, if the output predictions made by the current library at step 610 are an improvement over the predictions made by the previously trialled library, further examples are added to the training library. Conversely, if the predictions made by the current library at step 610 result in a higher uncertainty than the previously trialled library, examples are removed from the training library.

If the decision is that one or more examples should be added to the training library, this is done at steps 620 to 626.

At step 620, the user provisionally selects one or more log sections to add to the training library. Potentially appropriate log sections for inclusion in the library are selected by the user on the basis of inspection of one or more of the candidate results as discussed above (i.e. inspection of graphs such as those shown in FIGS. 7A to 7C). As has been described, the candidate results in the present embodiment were identified initially (i.e. in early iterations of the process) on the basis of the levels of uncertainty of the log classifications (i.e. the standard deviation of the result set), then on the basis of those results which crossed the 0.5 threshold. As noted, in this particular embodiment the selection for inclusion is a provisional selection and actual inclusion in the training library is subject to a further step in which any provisionally selected examples are compared against the existing training library examples (discussed further below). In alternative embodiments the further checking step may not be applied.

The provisional (or final) selection of examples for inclusion in the training library involves inspecting graphs of specific results such as those shown in FIGS. 7A to 7C. As described above, each of FIGS. 7A to 7C shows a graph in which the natural gamma reading 702, the Gaussian process output 704, and the standard deviation 706 are plotted (the Gaussian process output and standard deviation being multiplied by 100 to enable them to be viewed on the same graph). FIG. 7A is an example of a log section including a non-target feature signature that would be selected for addition to the training library by the user. FIG. 7B is an example of a log section including a target feature determined by the user to be too distorted to be added to the training library. FIG. 7C is an example of a log section including a target feature signature (i.e. AS1 and AS2 signature) that was not clearly identified by the model but should be, and as such is selected for addition to the training library.

As will be appreciated, there are limits to what a Gaussian process can reasonably distinguish. This limits the features that should be included in the training library. In the present example, due to the nature of the gamma logs used, the signatures of individual occurrences of the target features (i.e. the AS1 and AS2 signature) have many different possible variations, not all of which are entirely consistent with the "typical" AS1 and AS2 signature (see, for example, the variations shown in FIGS. 3A to 3C). Consequently, a distorted example of the target feature may be similar to an example of a non-target feature. Accordingly, not every example of a specific target feature should be included in a training library as the Gaussian process will start incorrectly identifying other geological signatures (which do not properly represent the target feature) as being the target feature.

Similarly, there is a limit to the negative examples that can be included in a library. If the positive and negative examples are too similar, then the overall uncertainty of the library will greatly increase, rendering the library unusable.

In order to avoid these situations care is needed when adding new examples to the training library to ensure they are compatible with the existing examples. To assist in identifying potentially problematic examples, the processing unit 202 plots any training examples provisionally selected for inclusion in the training library against the existing training library examples for comparison by the user. This comparison is made at step 622. Where a distorted positive signature closely resembles a distorted negative signature it is generally best to leave them both out of the training library. This way they both fall into the uncertain category that can be manually checked later, possibly using other sources of information such as downhole geochemistry or information from surrounding holes.

Figure 8A:
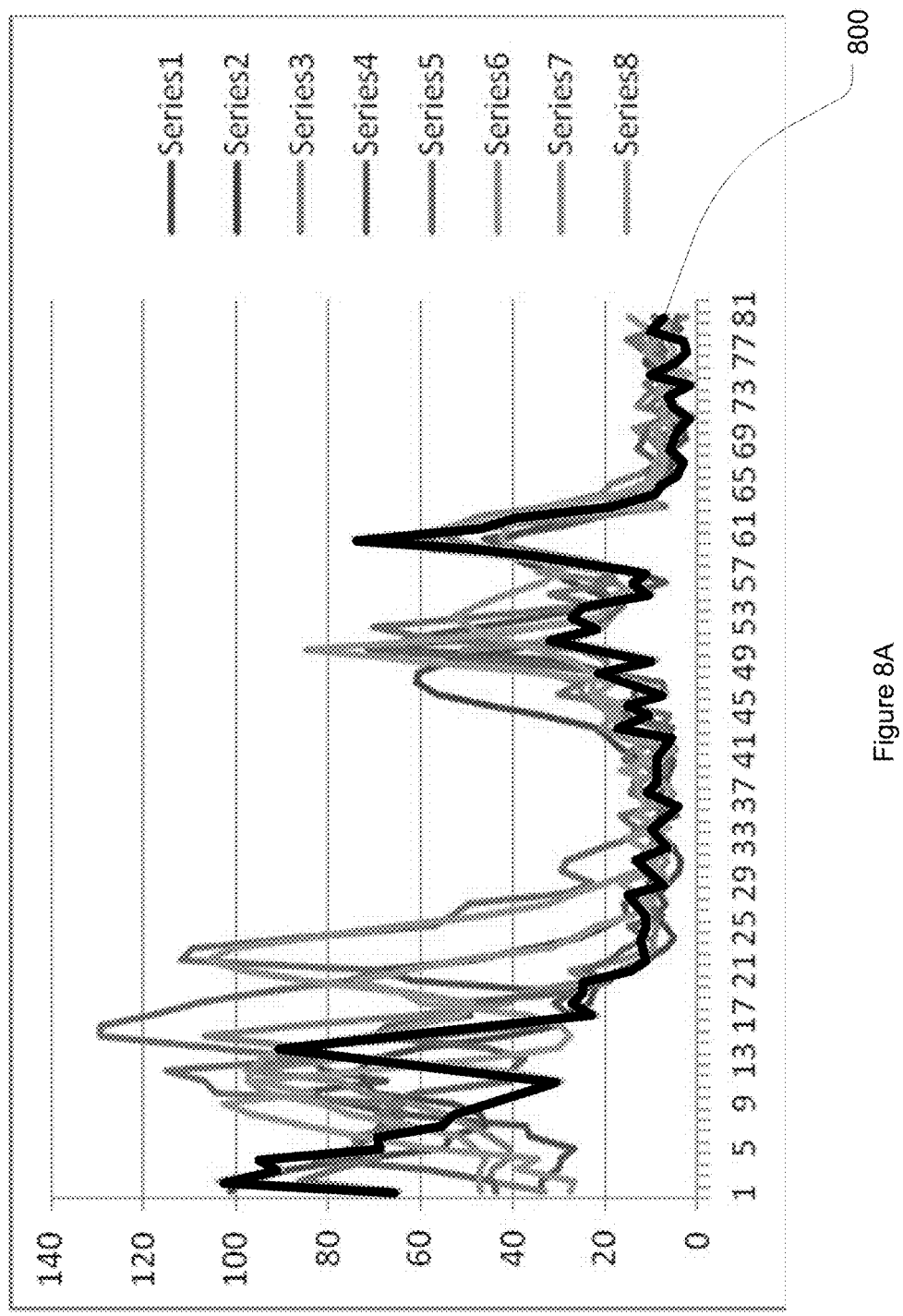
FIGS. 8A to 8C provide example graphs in which new training examples being considered for incorporation in the training library are plotted against existing training examples.
Figure 8B:
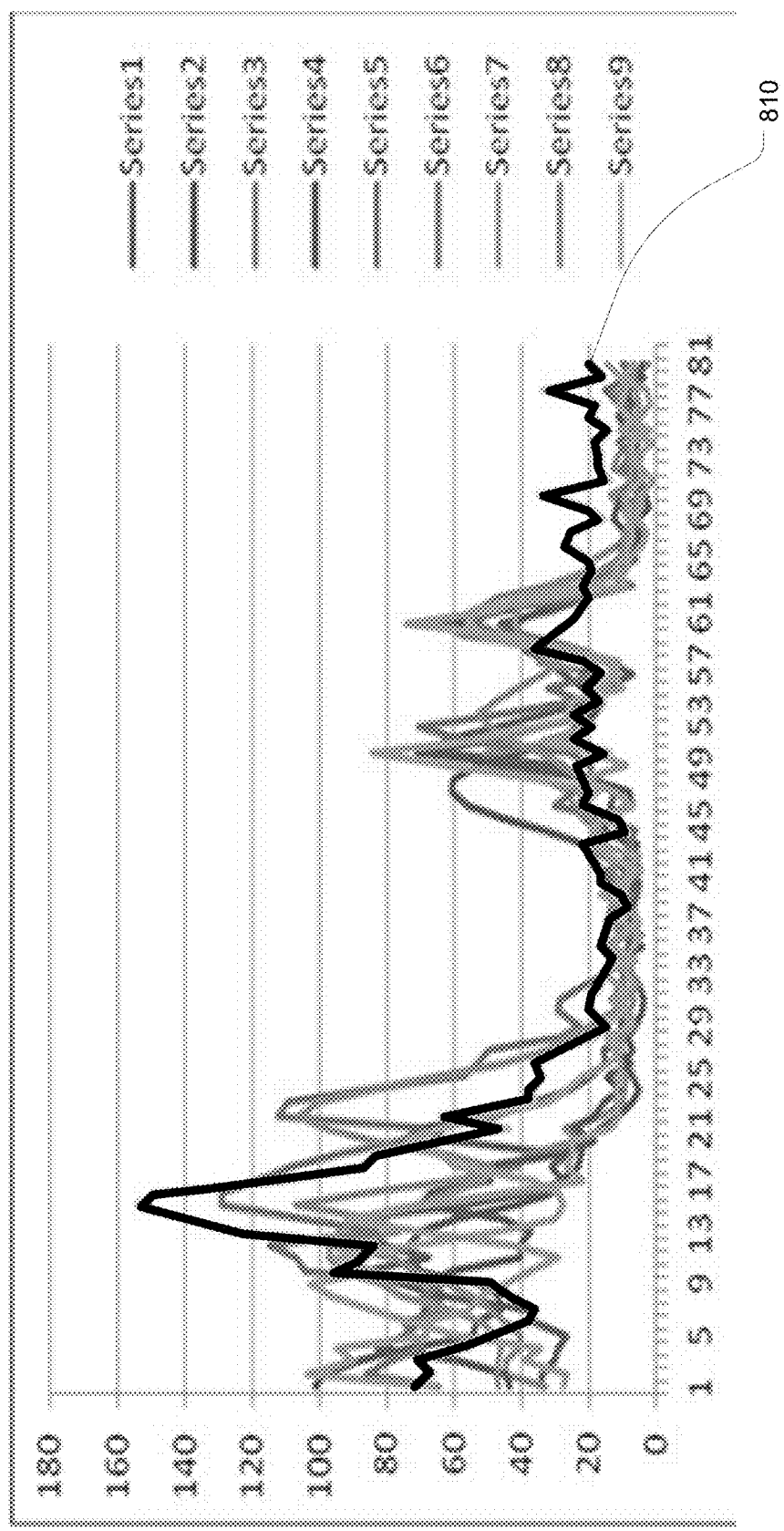
Figure 8C:
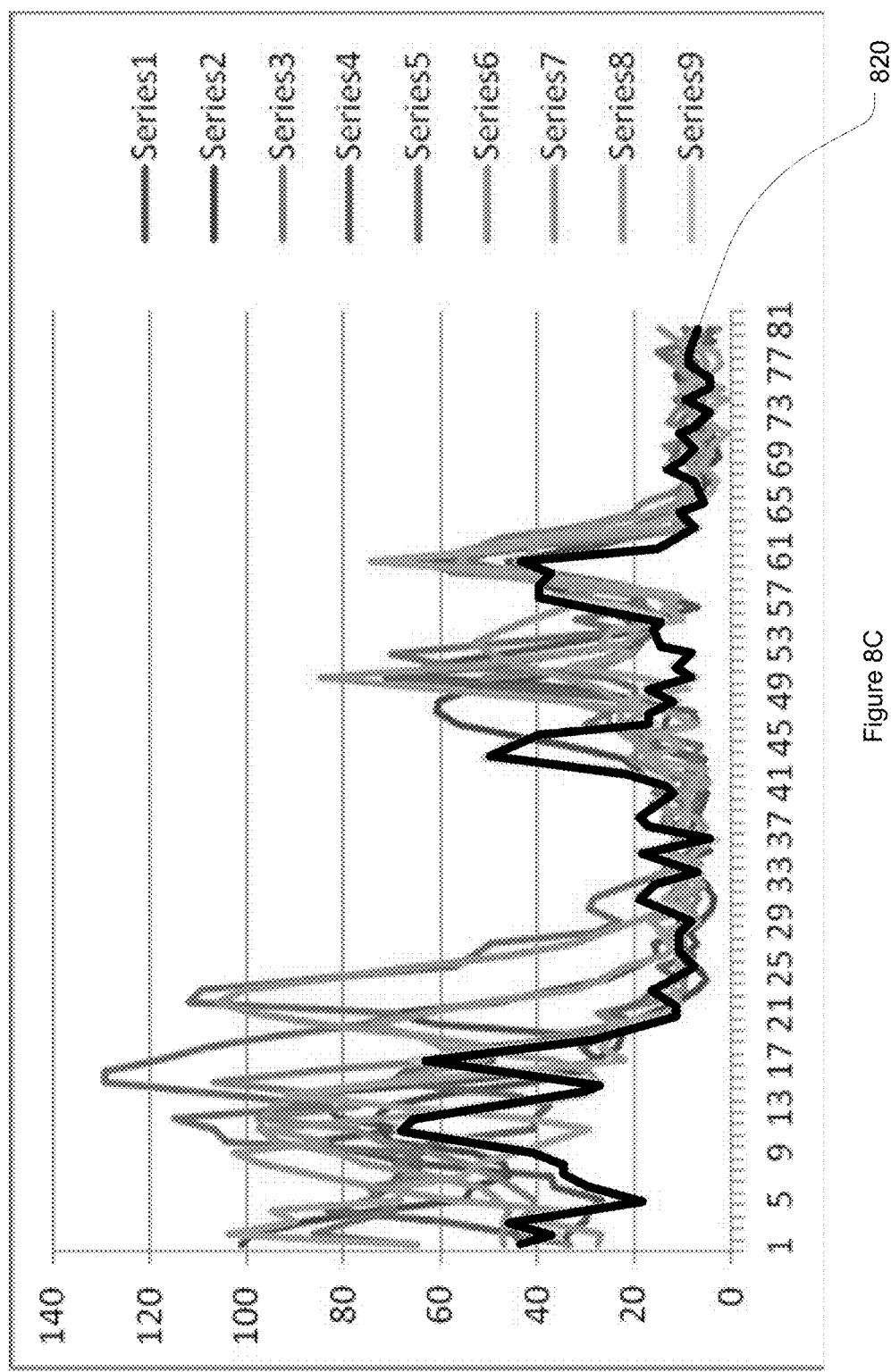

FIGS. 8A to 8C provide examples of graphs in which new examples being considered for addition to the training library are plotted against the existing training examples. FIG. 8A shows a new example (series 8, indicated by reference 800) which fits relatively well with the existing examples in the library and can be added as an example of the AS1 and AS2 signature. FIG. 8B shows a new example (series 9, indicated by reference 810) which is clearly different to existing the AS1 and AS2 examples and can be added to the training library as an example of a non-target feature signature. FIG. 8C shows a new example (series 9, indicated by reference 820) which would not be added to the training library. Although the series 9 example is an AS1 and AS2 feature, its signature is distorted (stretched) such that its peaks do not align with the peaks of the other examples. The inclusion of such a distorted signature in the library would have undesirable results.

If the user decides (at step 624) that the comparison shown at step 622 is not acceptable, the user returns to decision point 614—i.e. whether the model is acceptable. From here the user may view further candidate results for provisional selection (at step 620), select examples for removal (step 628), or determine that no further examples can usefully be added or removed from the training library and as such the model is, in fact, acceptable (and output at step 616).

The criteria described above are used to indicate which logs the user should consider for inclusion in the training library. Once one or more logs have been selected as including sections suitable for addition to the library, and compared to the existing examples to ensure they do not clash with existing library examples, the relevant sections of the selected logs are added to the training library at step 626, and the output file updated to include the classification(s) of the new example(s).

If the decision at step 618 is that an example should be removed from the training library, this is done at steps 628 and 630.

At step 628 one or more examples included in the library are selected for removal. In the present example two main criteria were used to select examples for removal from the training library. These were:

1. The quality of the examples of the signature of the target feature. The training library requires typical examples of the signature of the target feature. Including extreme outliers in the training library has a negative effect and as such logs of such outliers should be removed. For example, logs that are distorted because of folding or faulting of the stratigraphic sequence or affected by groundwater hydration of minerals should not be included in the training library.

2. Similarity and dissimilarity. The examples in the positive class should have a definite similarity to each other. If one or several logs are clearly distinct, then criterion one should be considered and the distinct examples possibly removed as outliers. Also, there should not be very similar logs in different classes. There may be cases where distorted examples of the target feature are similar to other features and in these cases they should be left out of both categories.

At step 630 examples selected for removal from the training library are removed (together with the corresponding entry in the training library output file).

Once the existing training library has been updated (e.g. by inclusion of new examples or removal of examples), steps 608 to 614 are repeated in order to learn the optimal hyperparameters of the updated/modified training library, classify some or all of the dataset with the model obtained using the modified training library, and assess the acceptability of the predictions made by the updated model. These steps (608 to 630) are repeated until the predictions made by the model and library are deemed acceptable by the user, which generally results in a relatively large library being built covering many different examples.

Once the training library is considered acceptable the training process is complete, and the model and training library are output (step 616) for further processing. As noted above, the model and/or training library represent a useful result in their own right given they are usable to process the geophysical dataset to identify likely instances of the target features.

In the present case the model is used to identify the target feature (i.e. the AS1 and AS2 signature) in the entire set of gamma logs for the site. It will be appreciated that the identification of the target feature in the geophysical data is, in itself, also a useful result.

Still further processing, however, can be undertaken. In the specific example at hand the further processing includes determining the depth of the AS1 and AS2 boundary (as described above), and using that depth to generate a model of the subsurface geology of the mine (also discussed above).

Active Learning Experiment Results—without Standard Deviation

The boundary outputs from the active learning method and test scenario described above were compared to an existing geological interpretation of the mine site to determine the accuracy of the method. In this particular instance a classification output of greater than 0.5 (50%) was considered to be a positive identification of the target feature (i.e. the AS1 and AS2 signature).

Without taking into account the standard deviation (discussed further below), the method provided an overall accuracy of 91.5% as shown in Table 2. It will be recalled that the accuracy of 88.9% with the non-active learning Gaussian process method described above.

TABLE 2

|  | Geological interpretation: AS1 & AS2 present | Geological interpretation AS1 & AS2 not present |
|---|---|---|
| Gaussian process: AS1 & AS2 positively classified | 7% | 0.8% |
| Gaussian process: AS1 & AS2 not classified | 7.8% | 84.5% |

The logs are again split into two groups, those where the Gaussian process detected a boundary and logs where the Gaussian process did not detect a boundary. Of the 465 logs where a boundary was detected, 89.9% of these were correctly located at the AS1 and AS2 boundary. The other 10.1% of the boundaries were incorrectly identified.

Of the 5511 holes in which the Gaussian process did not detect an AS1 and AS2 boundary, 91.5% were correctly classified and did not include an AS1 and AS2 boundary. The remaining 8.5% of the holes in which no AS1 and AS2 boundary was detected were incorrectly classified (insofar as there was AS1 and AS2 boundary in the gamma logs that was not identified).

Active Learning Approach Results—with Standard Deviation

In order to gain additional certainty with respect to the results the standard deviation of the classifications made by the model can also be taken into account. If the standard deviation of the result set is considered, the results can be split into additional categories. In this case an output greater than 50% is, again, considered a positive identification of the AS1 and AS2 signature/boundary. Further, however, if the output is greater than 50% after the standard deviation is subtracted it is considered a certain boundary. Conversely, if the output is less than 50% after the standard deviation is subtracted it is considered an uncertain boundary.

Similarly, where the Gaussian process does not identify the AS1 and AS2 signature/boundary, if the output is greater than 50% after the standard deviation is added it is considered uncertain, but otherwise it is considered certain that the log does not contain the boundary there. Table 3 shows the results of the experiment taking the standard deviation (and further categorisations) into account:

TABLE 3

|  | Geological interpretation: AS1 & AS2 present | Geological interpretation AS1 & AS2 not present |
|---|---|---|
| Gaussian process: AS1 & AS2 positively classified Certain | 2.7% | 0.1% |
| Gaussian process: AS1 & AS2 not classified Certain | 3.2% | 72.5% |
| Gaussian process: AS1 & AS2 positively classified Uncertain | 4.3% | 0.7% |
| Gaussian process: AS1 & AS2 not classified Uncertain | 6.7% | 9.8% |

The results indicate that the Gaussian process is certain of 78.5% of the boundaries identified, and that 95.8% of these boundaries are considered correct when compared to the geological interpretation.

If compared with the results obtained when the standard deviation was not considered, it is evident that many of the incorrect classifications are moved into the uncertain categories. Where the Gaussian process has identified an AS1 and AS2 boundary the associated accuracy is 89.9%. Within this result, the certain boundaries had an accuracy of 97.5% and the uncertain boundaries had an accuracy of 85.9%.

An accuracy of 91.5% was achieved for logs where the Gaussian process did not identify a boundary. Within this result, the certain holes had an accuracy of 95.8% and the uncertain holes an accuracy of 59.2%.

Overall, for this library 0.2% of the total logs were considered uncertain.

From these results it can be seen that using an active learning approach according to embodiments of the present invention results are improved in two ways. First, the results produced are more accurate. The traditional approach in with manual selection of the examples for the training library had an overall accuracy of 88.9% and the accuracy of the boundaries identified was of 66.7%. When the active learning approach was considered in the same way (without using the standard deviation) it had an overall accuracy of 91.5% and the accuracy of the boundaries identified was of 89.9%.

Secondly, when the uncertainty is also considered information is provided which illuminates which boundaries can be trusted and which boundaries will require manual checking. 95.8% of the boundaries that the Gaussian process identified as being certain matched the geological interpretation.

Further, the output from the active learning approach allows the data to be divided into two categories. The certain category where the user can trust the output and the uncertain category where the user will need to manually check the classification and possibly use other information to make a decision. This reduces the time required to compare the data, given that, in the present case, only 0.2% of the logs contained an uncertain output for the AS1 and AS2 boundary.

Based on the experimental data, the active learning according to an embodiment of the present invention increased the accuracy with which target features (AS1 and AS2 shale in this instance) were identified. Specifically, and when compared with traditional Gaussian processes, the overall accuracy increased from 88.9% to 95.8% when taking the standard deviation (as a measure of certainty) into account. The accuracy of the boundary locations identified increased from 66.7% to 97.5%.

In addition, the active learning approach provides a more efficient way of producing a training library when compared to previously known approaches. Further still, generation of the training library according to embodiments of the invention allows the entire data set to be used, which allows for the assessment of more variation in the gamma logs and permits better classification of the target feature.

Alternative Embodiments and Applications of the Invention

In the primary examples discussed above, features of the invention are described in the specific context of identifying the AS1 and AS2 shale signature from natural gamma logs. The efficient and accurate identification of this signature is itself a useful result. As described, however, the identification of the AS1 and AS2 signature can be used in further downstream processes, such as determining the depth at which the AS1 and AS2 boundary occurs, and generating data representative of three-dimensional maps of the subsurface geology of a mining environment. Such maps can, in turn, be used to plan and execute mining operations.

Such mining operations may be performed in an automatic or autonomous fashion. The term "automatic" refers to a system or process that executes a specific well-defined task that is often narrowly defined. "Automatic" implies following a set of well-defined rules and reacting in a defined way to a defined stimulus. "Automated systems" are those that have some automatic components or properties.

The term "autonomous" refers to systems that are more complex as the systems are able to respond to unknown stimuli and can function without a complete knowledge of their environments. Typically, an autonomous system does not require human intervention to respond to at least some unpredicted changes in its environment. Examples include self-guided and operated vehicles.

Open pit mining, for example of metal-bearing mineral or rock, normally involves the progressive accessing of an ore body followed by drilling, blasting, loading, and haulage of the released material. Each of these operations may be performed with reference to a subsurface map of the mine geology identifying the location of the ore. Iron ore, for example, is typically mined in large blocks from a series of benches and the various mining activities 126 (other than blasting) may be performed concurrently, resulting in diverse equipment, and often personnel, being present simultaneously in the mine site. A bench of ore may, for example, be 40 m long×20 m deep×10 m high and contain in the order of 8 kilotonnes of ore. Such a bench is first drilled to form a pattern of blast holes. In some instances the drilling residue may be analysed to assist in determining whether the material to be blasted comprises, on average, high grade ore, low grade ore or waste material. The blasted material is collected by shovels, excavators and/or front end haul loaders, loaded into haul trucks and transported from the mine pit. The material is then processed outside the mine pit.

One or more drilling units may be used to drill the pattern of blast holes. The drilling units may operate autonomously and may be controlled by control units located on the drilling units or in distributed systems. Relevant mining operations include planning the pattern of blast hole locations, planning trajectories of the drilling units to reach the blast hole locations, positioning the drilling units at the locations and controlling the drill operation. These operations generally require the fusion of a large amount of heterogeneous information about the terrain, including the information generated in accordance with various features of the present invention (e.g. the estimated depth of a feature of interest such as a shale/ore boundary, and/or a map of the subsurface geology). Suitable methods and systems for exploiting information from heterogeneous sources may be found in WO 2009/109007, filed on 4 Mar. 2009, which is incorporated herein by reference.

Mobile charging units may be used in the processes of loading and stemming drill holes with the correct mix of explosives.

Face inspection units may also move through the open pit to obtain geometrical and geological information about the site. The face inspection units may, for example, be autonomous mobile sensor stations. Real-time mobile assay units may also operate in the open pit. In some arrangements autonomous real-time survey units may operate in the mine site to provide geometric models of the mine in a time frame that is useful for planning and platform automation.

Shovels, including automated shovel units, may be used to excavate material from the open pit. Information about the terrain may be used in the automated control of the shovels, and may also be used to augment the perception of a human shovel operator. For example, a heads-up display may assist an operator in monitoring the site through dust or rain. Trucks may be used to remove the excavated material.

The drilling units, charging units, shovels, trucks, face inspection units, assay units and real-time survey units may all interact with a fused model of the mine terrain that includes information regarding the locations of features of interest derived from the methods described herein. The units may be controlled or supervised by an integrated automation system such as that described in PCT/AU2010/000494, filed on 30 Apr. 2010, the contents of which are incorporated herein by cross reference.

It will also be appreciated that the principles of the invention can be applied to the analysis/processing of alternative geophysical data, and with a view to classifying alternative target features. By way of example, alternative geophysical data could include geochemical data, density data, magnetic susceptibility. With respect to the classification, features of the invention may be applied in order to essentially identify/classify any feature of interest that has a distinctive data signature. Such features include, for example, coal seam boundaries in coal mines, and/or boundaries between zones of distinct geotechnical character in open pit and underground mines for different commodity types.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A computer implemented method for generating a probabilistic model usable to identify instances of a target feature in geophysical data sets stored on a memory device, the computer implemented method including:

(a) using a computer processing unit to generate a probabilistic model from a training library, the model for use in identifying instances of the target feature in the geophysical data sets, the training library including one or more target examples, each target example including a signature being indicative of the target feature, and one or more non-target examples, each non-target example including a signature being indicative of a non-target feature;

(b) applying, using the computer processing unit, the probabilistic model to one or more of the geophysical data sets to generate a plurality of results, each result associated with a processed geophysical data set and indicating a level of certainty as to whether that geophysical data set includes the target feature;

(c) processing, using the computer processing unit, the plurality of results according to an acceptability criteria in order to identify a plurality of candidate results, the candidate results being results associated with data sets having potential significance to the performance of the probabilistic model;

(d) receiving a selection of one or more of the candidate results and for each selected candidate result displaying on a display the result and its associated geophysical data set to assist a user in making an assessment as to whether or not the probabilistic model is an acceptable model for the processing of the geophysical data sets;

(e) receiving from a user an assessment as to whether or not the probabilistic model is an acceptable model; and (f) if the assessment received indicates the probabilistic model is an acceptable model for processing the geophysical data, outputting the probabilistic model and/or the training library; and wherein if the assessment received at step (e) indicates the probabilistic model is not an acceptable model for the processing of the geophysical data, the method further includes:

(g) receiving a selection of at least one example to be added to the training library, each example including a signature of either a target or non-target feature and being included in a data set associated with a candidate result, and modifying the training library by adding the at least one example; and/or presenting the training library examples to the user, receiving a selection of one or more examples for removal from the training library, and modifying the training library by removing the example or examples selected for removal; and (h) repeating steps (a) to (f) in respect of the modified training library.

2. A computer implemented method according to claim 1, wherein using the computer processing unit to generate the probabilistic model from the training library includes applying Gaussian processes to the training library.

3. A computer implemented method according to claim 2, wherein the acceptability criteria is based on a standard deviation of the plurality of results.

4. A computer implemented method according to claim 1, wherein the acceptability criteria is based on the occurrence of results which cross a predetermined threshold when the results are considered in conjunction with the level of certainty.

5. A computer implemented method according to claim 4, wherein the predetermined threshold is 0.5, and wherein consideration of a result in conjunction with the level of certainty includes:

if the result is greater than 0.5, subtracting the standard deviation to the result to see whether the resulting value is less than 0.5; or if the output is less than 0.5, adding the standard deviation to the result to see whether the resulting value is greater than 0.5.

6. A computer implemented method according to claim 1, wherein prior to adding the at least one example to the training library in step (g) the method includes, for each example selected to be added to the training library:

displaying a comparison of the selected example with one or more examples included in the training library to allow the user to make a compatibility assessment as to whether the selected example is compatible with the examples included the training library;

receiving an assessment as to whether the selected example is compatible with the examples included in the training library; and only modifying the training library by adding the selected example if the selected example is assessed as being compatible with the examples in the training library.

7. A computer implemented method according to claim 1, wherein the training library is an initial training library and the method further includes: generating the initial training library by:

receiving a user selection of at least one target example from the geophysical data sets;

receiving a user selection of at least one non-target example from the geophysical data sets; and adding the user selected target and non-target examples to the initial training library.

8. A computer implemented method according to claim 1, wherein each geophysical data set is a natural gamma data log including natural gamma measurements taken from a drill hole.

9. A computer implemented method according to claim 8, wherein the target feature to be identified in each natural gamma log is the existence of one or more marker shale bands.

10. A computer implemented method for identifying instances of a target feature in geophysical data sets stored on a memory device, the geophysical data sets having associated surface coordinates, the computer implemented method including:

implementing a computer implemented method according to claim 1 in order to generate a probabilistic model;

applying the probabilistic model to the geophysical data sets to generate a classification result for each data set, each classification result indicating whether the associated data set includes the target feature; and outputting at least those classification results which indicate that the associated data set includes the target feature, together with information enabling the surface coordinates of the geophysical data set associated with the result to be determined.

11. A computer implemented method according to claim 10, wherein a classification result is deemed to indicate that the associated data set includes the target feature if the result is above a classification threshold.

12. A computer implemented method according to claim 10, wherein a classification result is deemed to indicate that the associated data set includes the target feature if the result is above a classification threshold after a standard deviation of the classification results is subtracted from the classification threshold.

13. A computer implemented method according to claim 11, wherein the classification threshold is 0.5.

14. A computer implemented method for identifying the location of ore in a mining environment, said method including:

acquiring a plurality of geophysical data sets from the mining environment, each geophysical data set being associated with a drill hole having known surface coordinates;

implementing a computer implemented method according to claim 10 using said geophysical data sets to identify instances of a target feature occurring in the geophysical data sets;

using the classification results output from the computer implemented method according to claim 10 to predict a depth at which ore is likely to be found; and outputting depth data representing said predicted depth together with information enabling surface coordinates associated with said depth to be determined.

15. A method of mining including:

identifying the location of ore in a mining environment by implementing a computer implemented method according to claim 14;

extracting ore from the identified location.

16. A non-transient computer readable storage media including instructions which, when executed, facilitate a computer implemented method according to claim 1.

17. A system including:
a processing unit;
a memory; and
one or more input/output devices, wherein
the processing unit is connected with the memory and one or more input output devices by a communications bus, and wherein
the memory stores the geophysical data sets and instructions executable by the processing unit to facilitate a computer implemented method according to claim 1.

* * * * *